United States Patent
Hempleman et al.

(10) Patent No.: US 6,243,725 B1
(45) Date of Patent: *Jun. 5, 2001

(54) LIST BUILDING SYSTEM

(75) Inventors: James D. Hempleman; Sandra M. Hempleman, both of Chicago; Neil A. Schneider, Lake Zurich, all of IL (US)

(73) Assignee: Premier International, Ltd., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,995

(22) Filed: May 21, 1997

(51) Int. Cl.[7] .............................. G06F 15/00; G10H 7/00
(52) U.S. Cl. ............................... 707/530; 84/601; 84/645
(58) Field of Search .................................. 707/530, 500, 707/513, 526; 348/1; 709/200, 201

(56) References Cited

U.S. PATENT DOCUMENTS

| | | |
|---|---|---|
| 3,291,919 | 12/1966 | Robitaille . |
| 4,647,989 * | 3/1987 | Geddes ................................ 360/55 |
| 4,675,755 | 6/1987 | Baumeister et al. . |
| 4,703,465 | 10/1987 | Parker . |
| 4,779,252 | 10/1988 | Custers et al. . |
| 5,046,004 | 9/1991 | Tsumura et al. . |
| 5,113,383 | 5/1992 | Amemiya et al. . |
| 5,132,992 | 7/1992 | Yurt et al. . |
| 5,157,643 | 10/1992 | Suzuki . |
| 5,168,481 | 12/1992 | Culbertson et al. . |
| 5,173,888 | 12/1992 | An . |
| 5,197,047 | 3/1993 | Witheridge et al. . |
| 5,331,614 | 7/1994 | Ogawa et al. . |
| 5,341,350 | 8/1994 | Frank et al. . |
| 5,355,302 | 10/1994 | Martin et al. . |
| 5,428,732 | 6/1995 | Hancock et al. . |
| 5,475,835 * | 12/1995 | Hickey ................................ 348/600 |
| 5,481,509 | 1/1996 | Knowles . |
| 5,550,575 * | 8/1996 | West et al. ............................ 348/5.5 |
| 5,557,541 | 9/1996 | Schulhof et al. . |
| 5,583,922 * | 12/1996 | Davis et al. ........................... 379/96 |
| 5,586,235 * | 12/1996 | Kauffman ............................. 707/500 |
| 5,594,601 * | 1/1997 | Mimick et al. ..................... 360/72.2 |
| 5,726,909 | 3/1998 | Krikorian . |
| 5,734,823 | 3/1998 | Saigh et al. . |
| 5,793,980 | 8/1998 | Glaser et al. . |
| 5,809,246 * | 9/1998 | Goldman ............................. 709/217 |
| 5,860,068 | 1/1999 | Cook . |
| 5,864,868 | 1/1999 | Contois . |

(List continued on next page.)

OTHER PUBLICATIONS

Three copies of screens illustrating aspects of a CD player by the Windows 95 Operating System.

(List continued on next page.)

Primary Examiner—Joseph H. Feild
Assistant Examiner—Alford W. Kindred
(74) Attorney, Agent, or Firm—Rockey, Milnamow & Katz, Ltd.

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

114 Claims, 32 Drawing Sheets

U.S. PATENT DOCUMENTS

| | | |
|---|---|---|
| 5,903,892 | 5/1999 | Hoffert et al. . |
| 5,914,941 | 6/1999 | Janky . |
| 5,918,213 * | 6/1999 | Bernard et al. .................... 705/26 |
| 5,949,411 | 9/1999 | Doerr et al. . |
| 5,956,716 | 9/1999 | Kenner et al. . |
| 5,963,957 | 10/1999 | Hoffberg . |
| 6,011,761 | 1/2000 | Inoue . |
| 6,047,292 | 4/2000 | Kelly et al. . |
| 6,055,566 | 4/2000 | Kikinis . |
| 6,058,428 | 5/2000 | Wang et al. . |
| 6,065,042 | 5/2000 | Reimer et al. . |

OTHER PUBLICATIONS

Listing bearing the date Jan. 28, 1994 describing two interactive CD related programs, CDBase and CDBase Player.

Listing bearing the date Jan. 24, 1996 describing "A Real 32 BIT Windows 95 CD Player".

Listing bearing the date of Jul. 29, 1996 describing "CDRunner", a CD–related program.

Listing bearing the date Feb. 12, 1996 describing "Music CD", a Windows CD player.

Listing bearing then date Feb. 22, 1996, two pages, describing "Super CD", a Windows CD Driver.

Listing bearing the date Jul. 23, 1995 describing a CD ROM player for use on a PC.

Listing bearing the a date Jul. 20, 1995 describing a CD Assistant V1.0 for Windows.

Listing bearing the date Feb. 1, 1994 describing CDMASTER version 1.2 CD player.

Listing bearing the date Oct. 13, 1996 describing "EagCD", a program for playing CDs.

Listing bearing the date Feb. 5, 1996 describing "CD Satellite 3", a music playing program.

Listing bearing the date Feb. 1, 1994 describing "CDAUDIO V.27U", a CD audio player.

Listing bearing the date Feb. 2, 1994 describing an Audio Compact Disc Player for Windows.

Listing bearing the date Feb. 1, 1994 describing a CD player for Windows.

Listing bearing a date Jun. 23 1994 describing "MEGA CD V1.1 Audio Honker for Windows", a CS audio player.

Listing bearing the date Dec. 20 1994 describing "WinDisc", a CD audio player.

Listing bearng the date Jan. 24, 1996 describing "A Real 32 BIT" CD player for Windows 95.

Listing dated Feb. 1, 1994 describing a package called "CD Player 2.0 for Windows".

Listing dated May 25, 1995 describing "CD Wizzard", a CD audio player.

Listing dated Sep. 14, 1995 describing CD Tray, Version 3.03, a data base system for CDs.

Listing dated Aug. 13, 1995 describing "Optical Jammer 4.0", a CD audio player.

Listing dated Oct. 13, 1996 describing "EagCD", an audio CD playing utility.

Listing dated Feb. 1, 1994 describing "CDMASTER", a CD audio player.

Listing dated Oct. 3, 1993 describing "Audio Pro", a CD audio player.

Listing dated Nov. 5, 1995 describing "The Pause Provider" for editing a player list.

Listing dated Apr. 16, 1995 describing "Version 4.00 of DMP", a module player for MS–DOS machines.

Listing dated Dec. 20, 1994 describing "WINDISC", an audio CD player.

Listing dated Feb. 5, 1996 describing "CD Satellite 3", an audio CD player and playlist builder.

Listing dated Nov. 14, 1995 describing "RibbonCD V1.0", a CD player for Windows.

Listing dated Oct. 17, 1994 describing "CDBar", an audio CD player for Windows.

Listing dated Dec. 17, 1995 describing "CD Assistant", a music collection organizer.

Listing dated Jul. 30, 1995 describing "HomeWorks" and "Personal Possessions" programs for organizing personal property such as records, tapes and CDs.

Listing of CD/Spectrum Pro 3.2 Home Page, 2 sheets, a CD audio player, with a last date of Jun. 19, 1997 and two sheets associated therewith defining CDDB Database Connectivity.

Printout dated Dec. 31, 1996 which describes "CD–REC" for recording off of an audio–CD.

Listing dated Sep. 14, 1994 which describes "CD Audio Recorder", for recording off of audio CD.

Listing dated Dec. 17, 1995 describing "CD Assistant" for organizing a music collection.

Listing dated Dec. 31, 1996 which describes "CD–REC" for recording an audio–CD.

Listing dated Feb. 20, 1994 describing "CDGP" for digital recording of an audio–CD.

Listing dated Jul. 11, 1994 which describes "MODAC", a recorder and a player of WAV files.

Listing dated Dec. 31, 1996 which describes "CD–REC" for recording an audio–CD.

Listing dated Sep. 4, 1994 which describes "CD Audio Recorder" for recording WAV files off of an audio CD.

Listing dated Oct. 17, 1993 which describes "Wave After Wave". a CD Audio player for Windows 3.1.

Listing dated Apr. 30, 1996 which describes a jukebox playing module usable with Windows 95.

Listing dated Jun. 8, 1993 which describes "Multimedia Changer V1.0" for playing WAV files.

Listing dated Jan. 15, 1995 which describes "WaveMaster", a program for playing. WAV files.

Listing dated Feb. 1, 1994 which describes a CDAudio player for Windows.

Listing dated Apr. 16, 1997 which describes "CDMaster", a CD player module.

Listing dated May 18, 1996 which describes "TapeMaker", a system for organizing a music collection.

Article dated Dec. 1, 1997 entitled "Download favorite music from Web into computer".

An article believed to have been published Aug. 3, 1997 entitled "World Wide Wurlitzer".

* cited by examiner

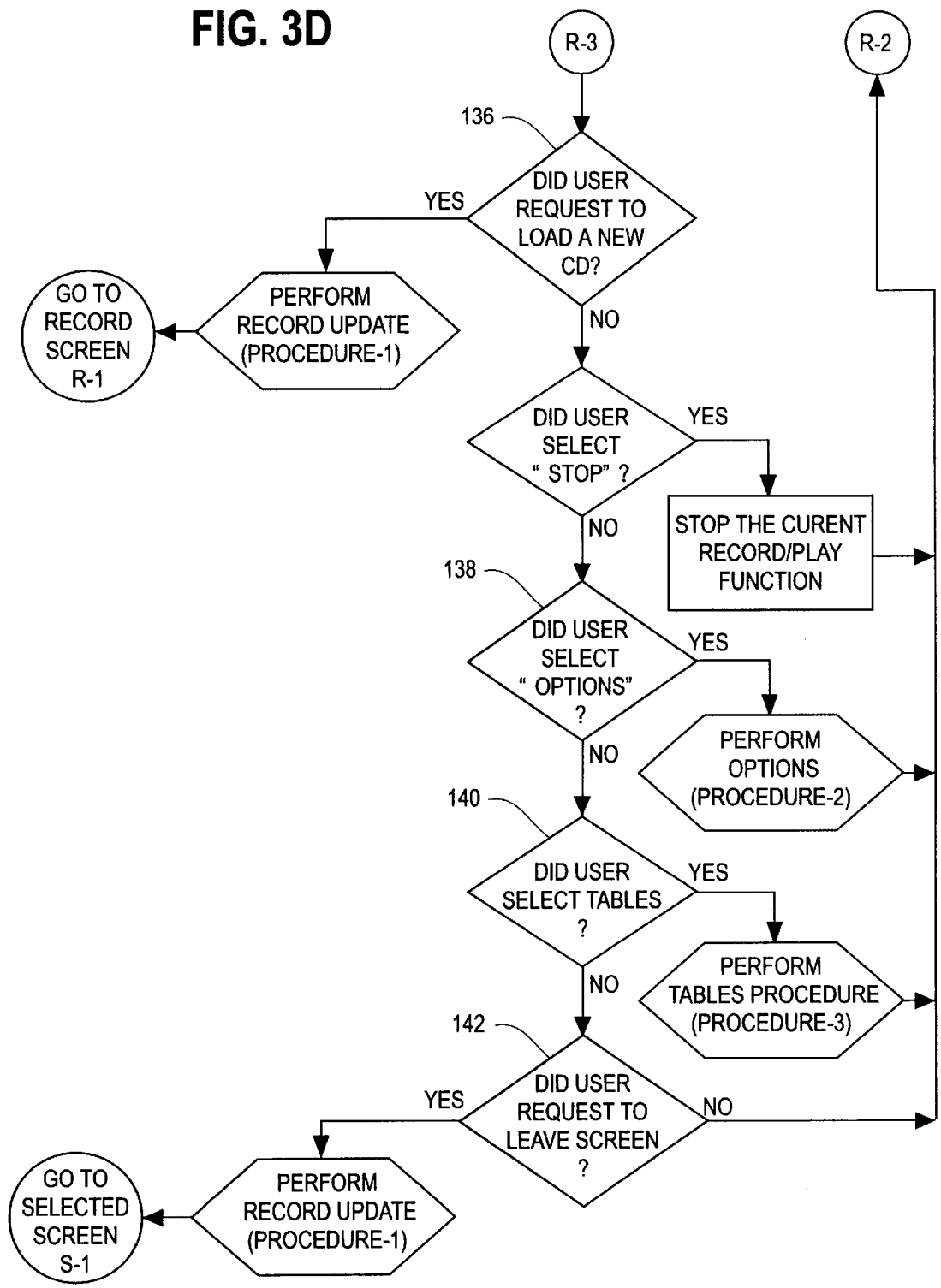

FIG. 4C

CD Recorder

File  Options  Tables  Help

Recorder | PlayList Editor | PlayList Player | Reports

CD Title: Waiting to Exhale

| Track | Length | Recorded | Title | Artist | Type | Comments |
|---|---|---|---|---|---|---|
| 1 | 3:24 | 4/9/97 | Exhale | Houston, Whitney | Pop | Audio and video |
| 2 | 4:37 | No | | | | |
| 3 | 4:27 | 4/18/97 | Let it flow | Braxton, Toni | Pop | Audio only |
| 4 | 4:19 | No | | | | |
| 5 | 4:52 | No | | | | |
| 6 | 5:00 | No | | | | |
| 7 | 4:57 | No | | | | |
| 8 | 4:06 | No | | | | |
| 9 | 4:48 | No | | | | |
| 10 | 4:31 | No | | | | |
| 11 | 4:32 | No | | | | |
| 12 | 4:21 | No | | | | |
| 13 | 3:23 | No | | | | |
| 14 | 5:59 | No | | | | |
| 15 | 5:09 | No | | | | |
| 16 | 4:26 | 4/18/97 | Count on me | Houston, Whitney | Pop | Audio only |

NewCD  Play  Stop  Record

Volume

Current Time: 06:46 pm

FIG. 4G

PlayList Editor

File  Options  Tables  Help

Recorder  PlayList Editor  PlayList Player  Reports

Media Inventory   Change Selection

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | Rock N Roll | | 4/21/97 | 2:12 | yes |
| Help me Rhonda | Jan & Dean | Rock N Roll | | 4/29/97 | 2:56 | yes |
| I believe in you and me | Houston, Whitney | Pop | | 4/29/97 | 4:02 | yes |
| Let it flow | Braxton, Toni | Bluegrass | Audio only | 4/18/97 | 4:27 | yes |
| Little Honda | Hondells | Rock N Roll | | 4/21/97 | 2:02 | yes |
| My heart is calling | Houston, Whitney | Pop | | 4/29/97 | 4:15 | yes |

Destination PlayList  Change PlayList  Save PlayList  Title: Dinner music 1  Total Play: 1:38:45

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

▲ Play  ■ Stop

Volume  L  R

Current Time: 06:54 pm

| Media Inventory | Change Selection | | | | | |
|---|---|---|---|---|---|---|
| Title | Artist | Type | Comments | Date Recorded | Time | In List |
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | | | 4/21/97 | 2:12 | yes |
| Help me Rhonda | Jan & Dean | | | 4/29/97 | 2:56 | yes |
| I believe in you and me | Houston, Wh | | | 4/29/97 | 4:02 | yes |
| Let it flow | Braxton, To | | | 4/18/97 | 4:27 | yes |
| Little Honda | Hondells | | | 4/21/97 | 2:02 | yes |
| My heart is calling | Houston, W | | | 4/29/97 | 4:15 | yes |

Save PlayList

You have edited the current PlayList. Please select how you wish to save the changes

- Save to Existing PlayList
- Save to New PlayList
- Discard the Changes

| Destination PlayList | Change PlayList | Save | | | |
|---|---|---|---|---|---|
| Title | Artist | Type | Date Recorded | Total Time |
| Surfin' Safari | Beach Boys | | | 4/9/97 | 2:03 |
| Da Doo Ron Ron | Crystals | | | 4/9/97 | 4:26 |
| Surfer Girl | Beach Boys | | | 4/9/97 | 6:42 |
| My heart is calling | Houston, W | | | 4/29/97 | 10:57 |
| Papa oom mow mow | Rivingtons | | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

OK

Volume  Play  Stop

Current Time: 07:03 pm

LIST BUILDING SYSTEM

FIELD OF THE INVENTION

The invention pertains to software driven systems and methods for developing audio/video sequences. More particularly, the invention pertains to such system and methods wherein a user can create an editable list of works which can be presented.

BACKGROUND OF THE INVENTION

With the advent of CDs a wide variety of music, music videos or video sequences are conveniently available for a user in a non-analog, digital format The advantages of digital recording of both audio and video have been recognized and are to a great extent realized with the ready availability of pre-recorded CDs.

While convenient, pre-recorded CDs present a problem to a user in that while it is possible to select sequentially between the pre-recorded works on a given CD, to switch to another artist or group it is necessary to have multiple drives available or to remove one CD and insert another at the appropriate time. While possible, such arrangements are at the very least inconvenient. In addition, because of the delays inherent in switching from one CD to another, the audio or video output might be lost for an undesirably long period of time thereby detracting from the ambiance afforded by the performance. In addition, listeners at times are only interested in one or two of the tracks on a CD in a given situation.

There thus continues to be a need for systems and methods which will make it possible to combine works by a variety of performers or artists in a relatively arbitrary fashion and to present those works in a given sequence in a fashion that is convenient but which at the same time is cost effective. It would also be desirable to be able to use widely available personal computers as control elements in such systems.

SUMMARY OF THE INVENTION

A system and a method of arranging media elements for later replay make it possible to create new sequential presentations of the elements. The elements can be obtained from a local medium such as a CD, or a video tape. Alternately, the elements can be obtained from a remote location via wired or wireless transmission. Elements can include audio works such as music or audio/visual works including advertisements, music videos or other types of elements.

The elements can be stored on a readable digital storage medium. Some or all of the elements can be played back or performed individually.

A collection of separate elements can be identified and arranged. One form of arrangement is a list. Another is a non-linear tree-like arrangement.

The collection can be played back or performed sequentially as specified in a list. Alternately, the elements can be performed interactively as specified in a tree. In this embodiment, tree nodes represent decision points for a viewer or a listener.

A graphically-oriented editor is provided for building or editing lists or trees. The lists or trees can be stored and subsequently retrieved for editing or performing the collected media elements.

Output can, in one aspect, be an audible or a visible performance of the elements in accordance with a selected list or tree. In another aspect, the collection can be written to a medium. Hence, a CD or other digital medium can be written, or audio or video tapes can be recorded. The output medium is not a limitation of the invention.

In yet another aspect, a system incorporating a card reader or a vending unit can be used to build a list of elements. In this instance an appropriate credit needs to be established before an element can be added to an on-going collection being performed.

Subsequent to a credit being established and a selection or selections made in accordance with the credit, elements can be added to the list and performed. Elements can be exclusively audio. Alternately, elements can include both audio and video components without limitation.

In yet another aspect, the method includes building a list of media elements which can come from a variety of sources. Preferably, the media elements are storable in a digital format.

Subsequently, the list can be reviewed visually by a user and either modified or edited for the purpose of creating a sequence of media elements to be replayed or presented. Subsequently, the list is executed and the elements are either presented audibly or visually or both in accordance with their characteristics.

In a further aspect, a digitized inventory of media elements can be created by either reading a local digital medium, such as a CD ROM or by receiving, via wireless transmission, digitized sequence of works which can then be stored in the inventory. If desired, the user can preview some or all of any element in the inventory.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 4A through 4K illustrate various screens presentable by the control program illustrated in FIGS. 3A through 3P;

DETAILED DESCRIPTION OF THE PREFERRED EMBODIMENTS

Figure 1:
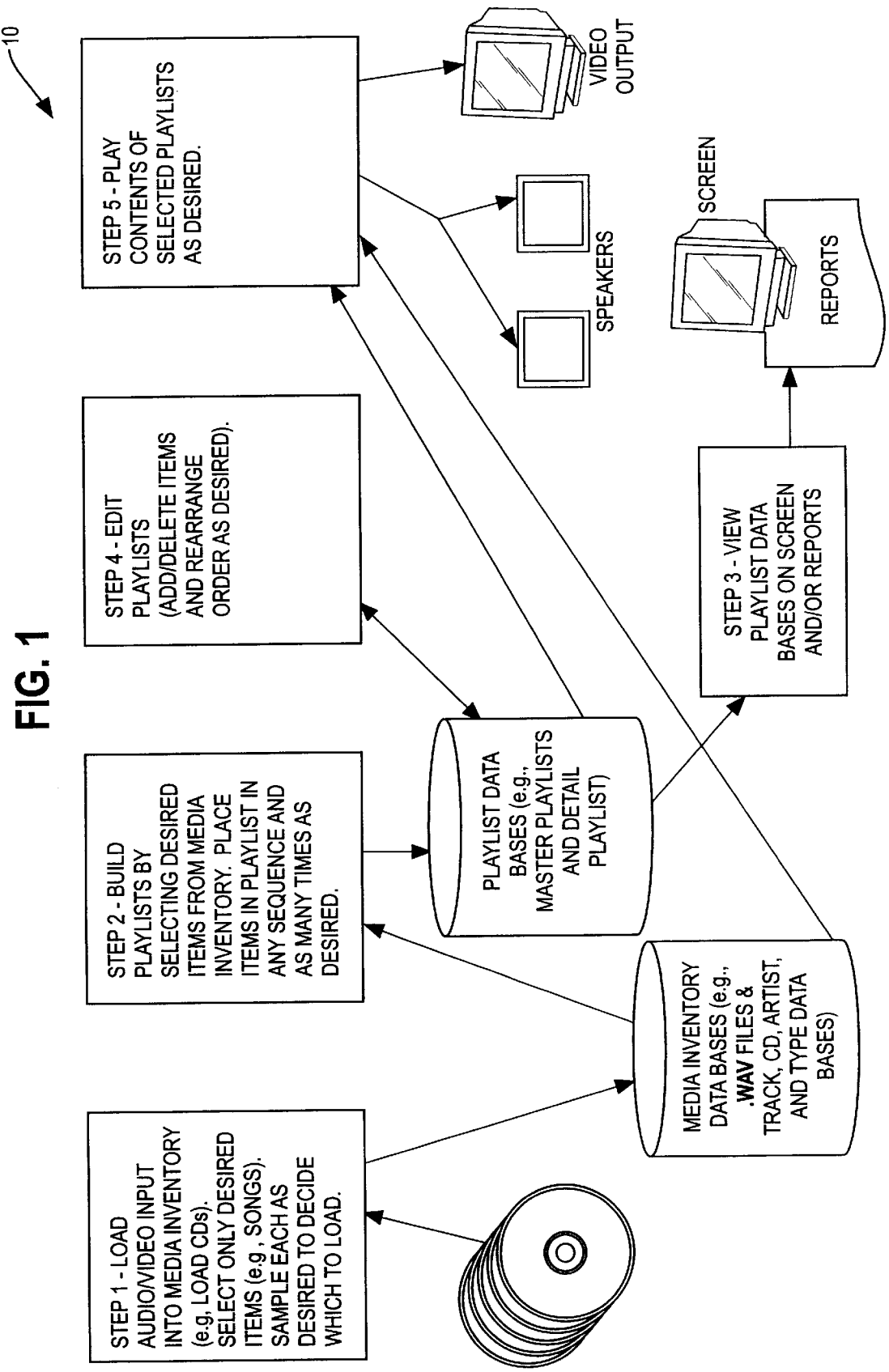
FIG. 1 is an overall flow diagram of a method in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the present invention enable the user to acquire, for example, digitized audio or audio and video works, which are of interest and which are to be represented either in real time as an audio or an audio/visual work or to be written onto a digital storage medium as part of a sequence selected by the user. Functional capability is provided enabling the user to create one or more composite play or presentation lists which incorporate a plurality of titles or designations of the works in a user selected order. The works could come from a variety of different sources and could include other types of sensory outputs without limitation.

As part of the list preparation process, the user can listen to or view some or all of any of the works. A new list can be graphically created. An existing list can be edited to revise existing works identified in the list, change the order of presentation or to add new ones. Subsequently, the list can be executed and the works performed.

Execution of the list will present the works in the determined sequential order audibly or visually and audibly depending on the nature of the work. Alternately, the works represented on the list can be written to a digital storage medium, such as a CD or DVD for subsequent presentation.

FIG. 1 illustrates steps of a method 10 for preparing executable playlists in accordance with one aspect of the invention. In an initial step, selected audio or video elements can be loaded into a digital database, a media inventory, for review and subsequent presentation. Media elements can be obtained from locally played sources or by wireless signals received from a remote source, such as via an antenna, which are demodulated and stored in digital form in the media inventory.

In the next step, a plurality of playlists can be created by graphically selecting media elements to be entered into a selected list from the inventory. As part of the step, one or more playlist records can be built and stored.

In a subsequent step, the lists in the playlist database can be viewed and various reports concerning the subject list can be created.

In a subsequent step, one or more of the lists can be graphically edited thereupon rearranging items in a list, adding items or deleting items as desired.

Finally, a particular list can be selected and executed. Audio works are presented sequentially, in accordance with the selected list, via audio output transducers, typically speakers. Video works or audio/video works or presented in accordance with the selected list on a video display in combination with speakers.

If desired, a selected list or lists can be written to a storage medium such as a CD ROM for later use. If desired, the associated media elements can also be written on to the medium.

A variety of services can be provided to a user while carrying out the steps of the method 10. Analysis can be conducted of the characteristics of various works. For example, beats per minute can be determined and audio works can be sorted accordingly. A list or lists can be created in accordance with a pre-selected tempo or beats per minute.

Sorting or selecting based on other features of audio or video characteristics of the works can also be included. Presentations via a selected list can be controlled based on selected features.

For record keeping purposes, the number of times a given media element is presented or executed can be logged along with date and time information. Reports reflecting any lists created based on any of the above selection features or characteristics can also be printed for invoicing, billing or royalty payment purposes.

Figure 2:
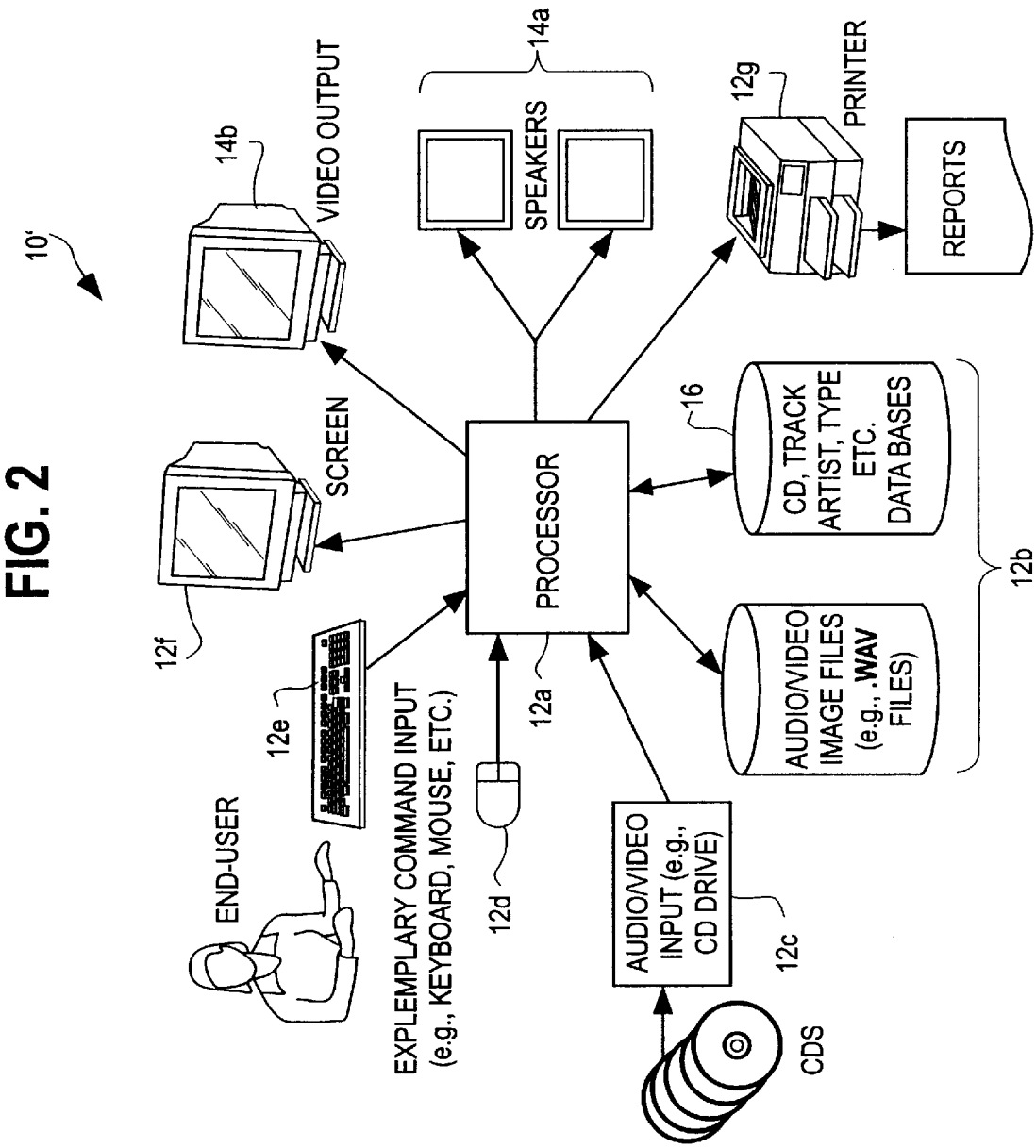
FIG. 2 is a block diagram of a system useable for practicing the method of FIG. 1.

FIG. 2 illustrates in block diagram form a system 10' for implementing the method 10 of FIG. 1. The system 10' incorporates a programmable processor 12a, for example, a personal computer of a selected variety. Coupled to the processor 12a is a mass digital storage medium 12b, such as a hard disk drive for storage of various databases and programs.

Coupled to the processor 12a is a source of digitized audio or audio/visual input signals such as a CD ROM drive 12c. Media elements or works can also be received wirelessly. Also coupled to the processor 12a are user input devices such as a mouse 12d and a keyboard 12e. Other input devices could also be used without limitation.

Output devices include a display screen 12f of a type conventionally used with programmable processors to present visual display of ongoing programs being executed to the user. A printer 12g is available to provide reports.

Audio and video output devices for media elements include speakers 14a and video output device 14b which can be of a size and quality suitable for the type of works being displayed. Other output devices could also be used.

The hardware components of the system 10' interact in accordance with the user inputs and under the control of a control program 16 stored in one of the storage devices 12b. The control program 16 includes pre-created commands for carrying out the method 10 illustrated in FIG. 1.

Figure 3A:
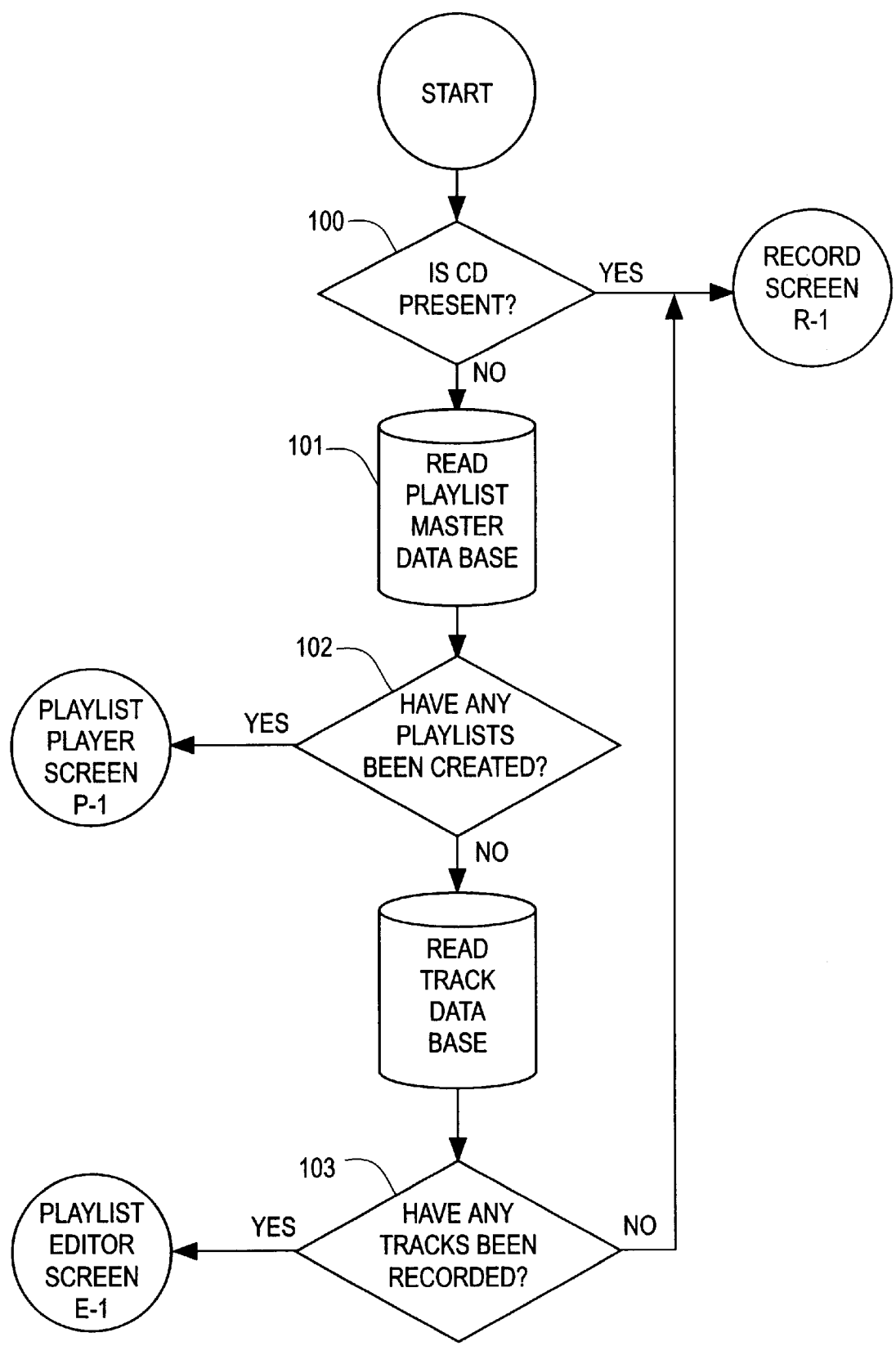
FIGS. 3A through 3P taken together illustrate a flow diagram of a control program useable with the system of FIG. 2.

The control program 16 is described in a set of flow diagrams illustrated in FIGS. 3A . . . 3M. FIGS. 4A–4K illustrate various exemplary displays presented on the display unit 12f while the control program 16 is executing.

Figure 3B:
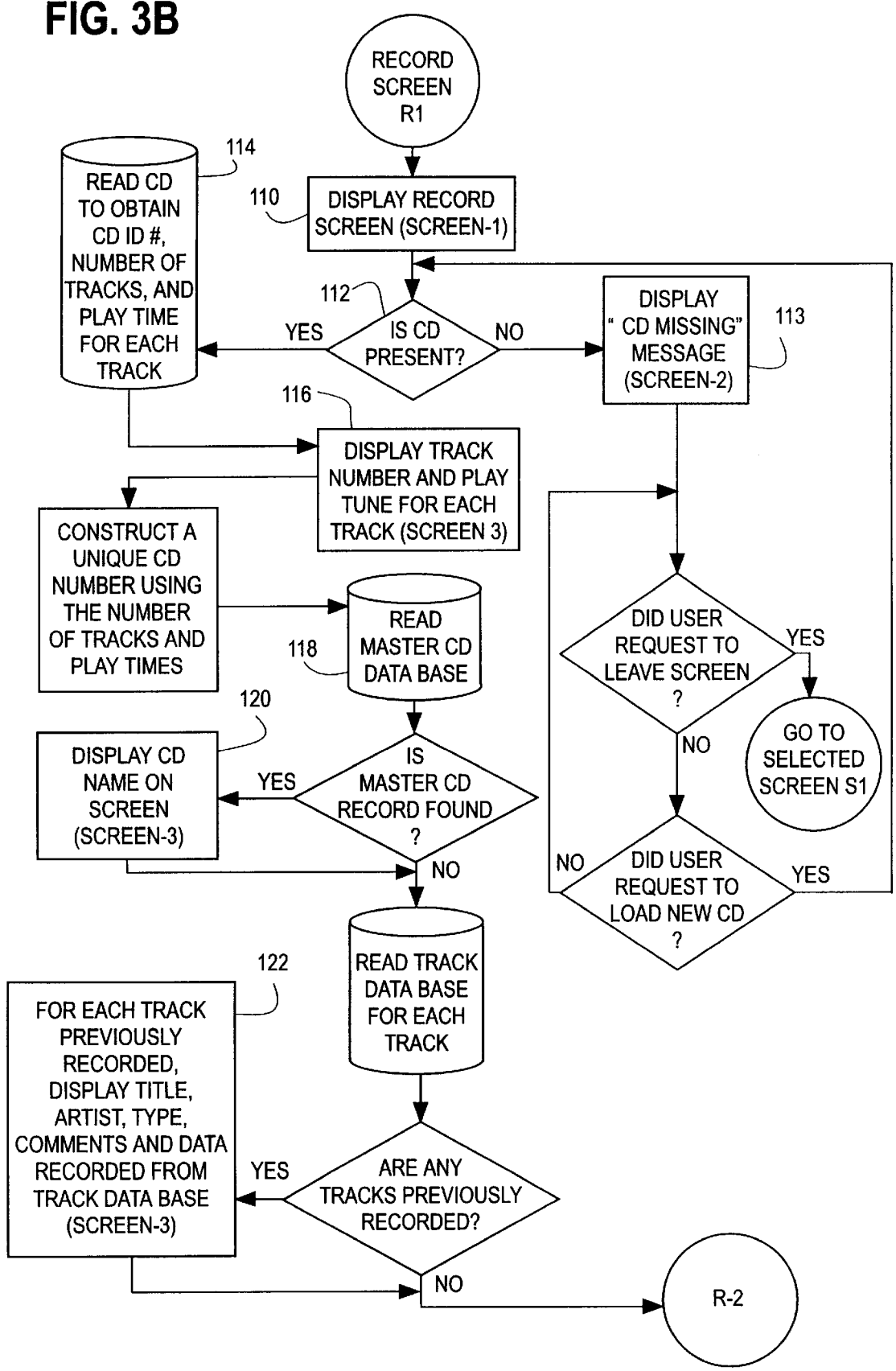
Figure 3C:
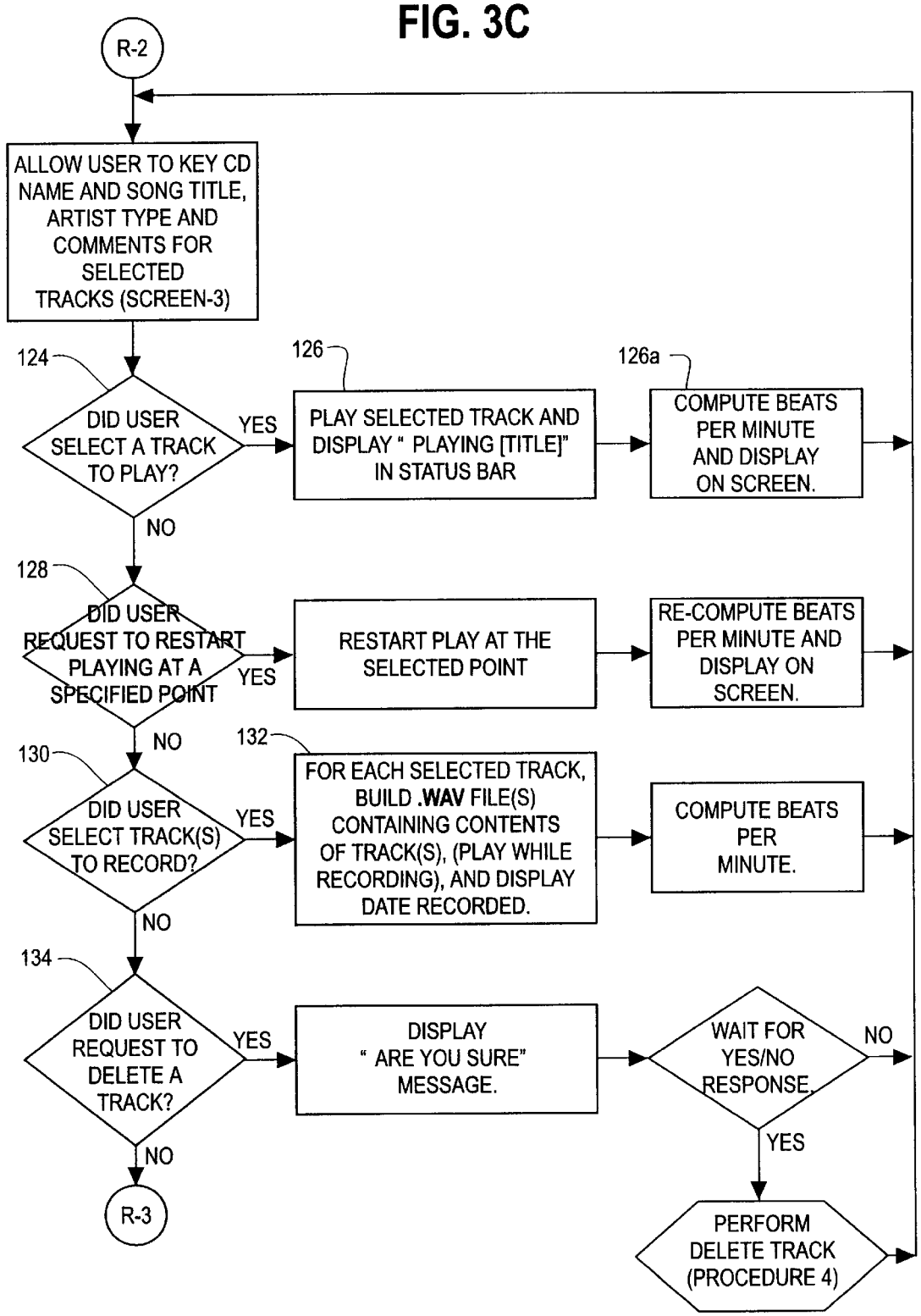
Figure 3E:
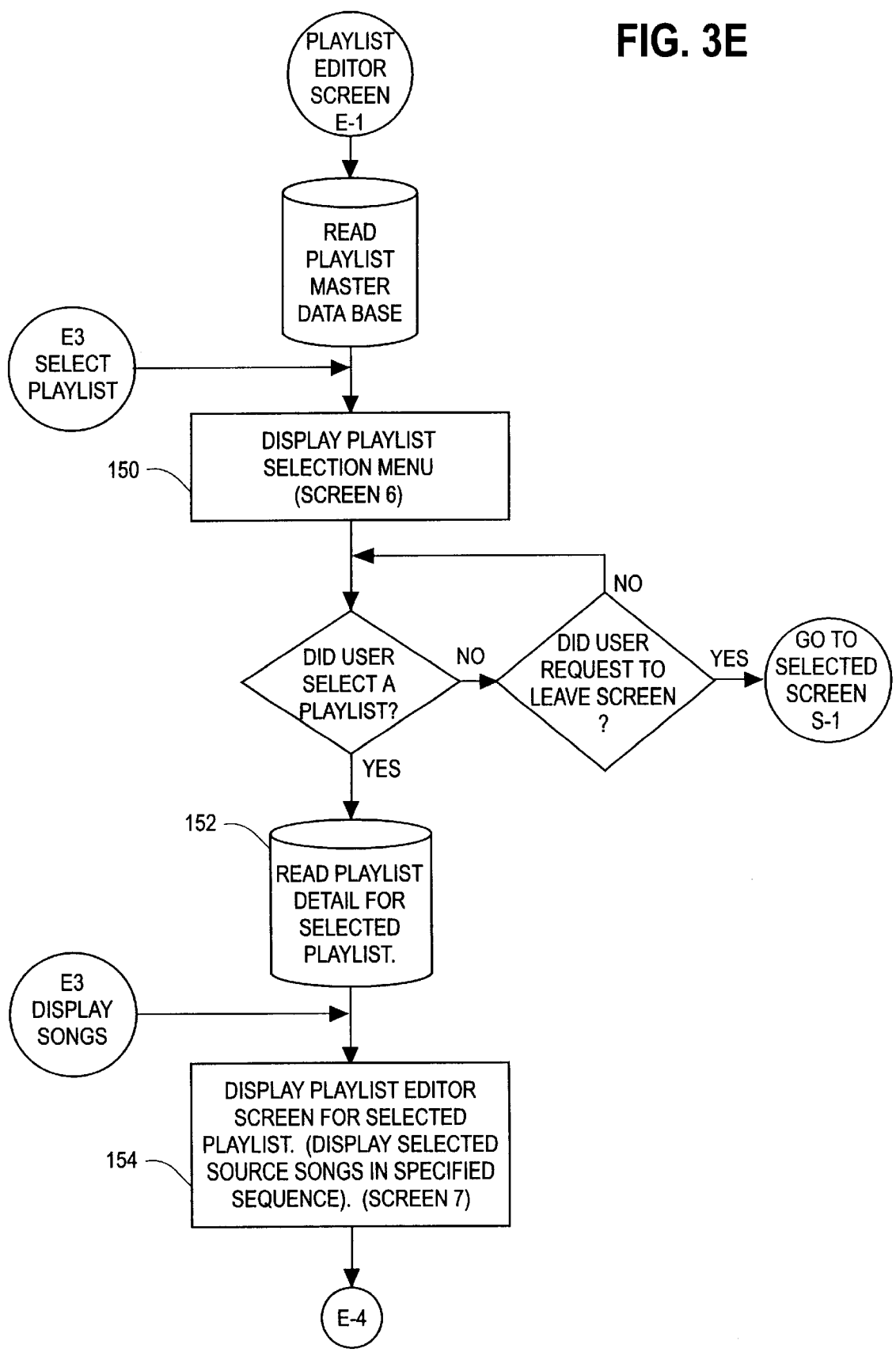
Figure 3F:
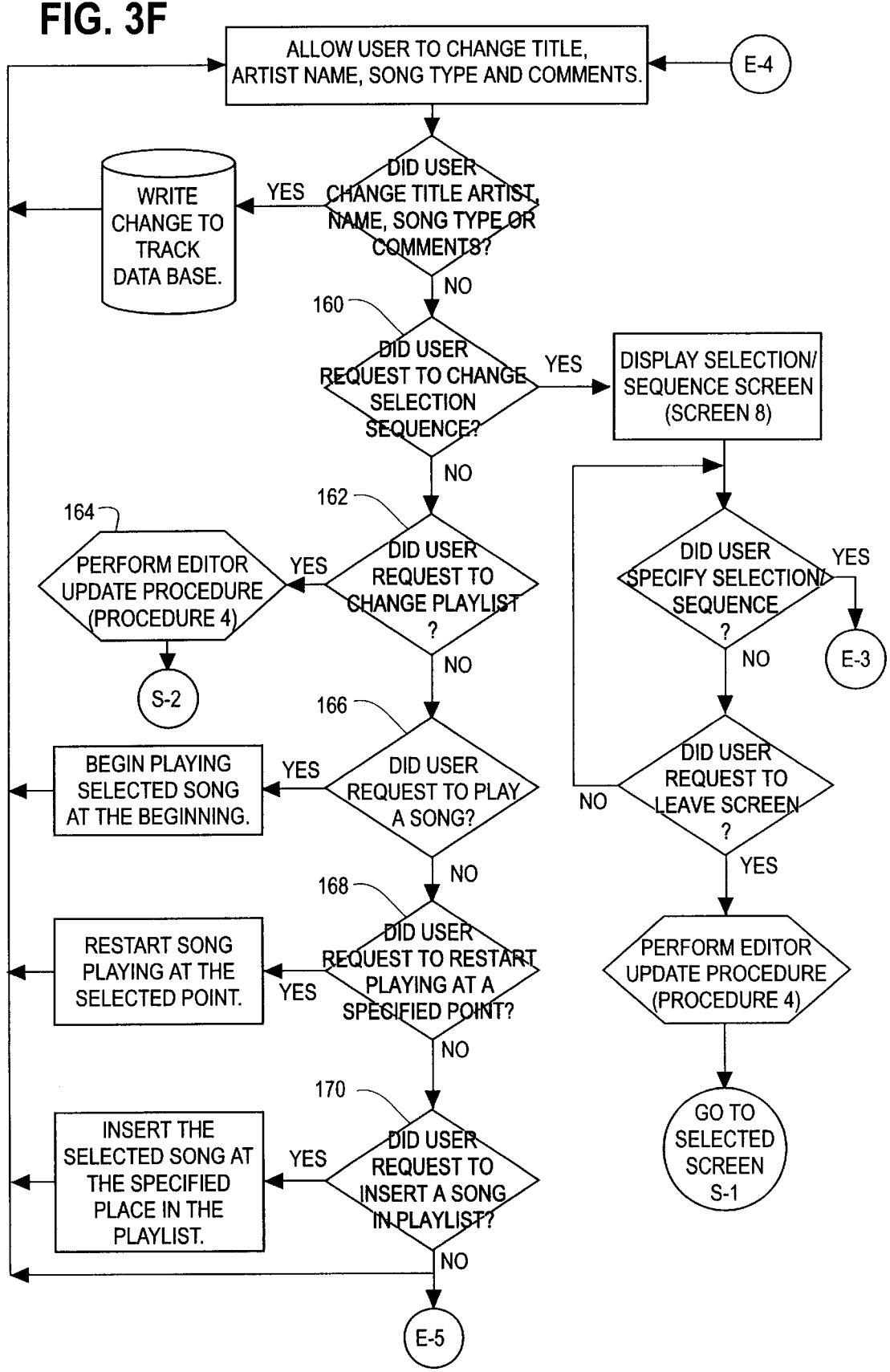
Figure 3G:
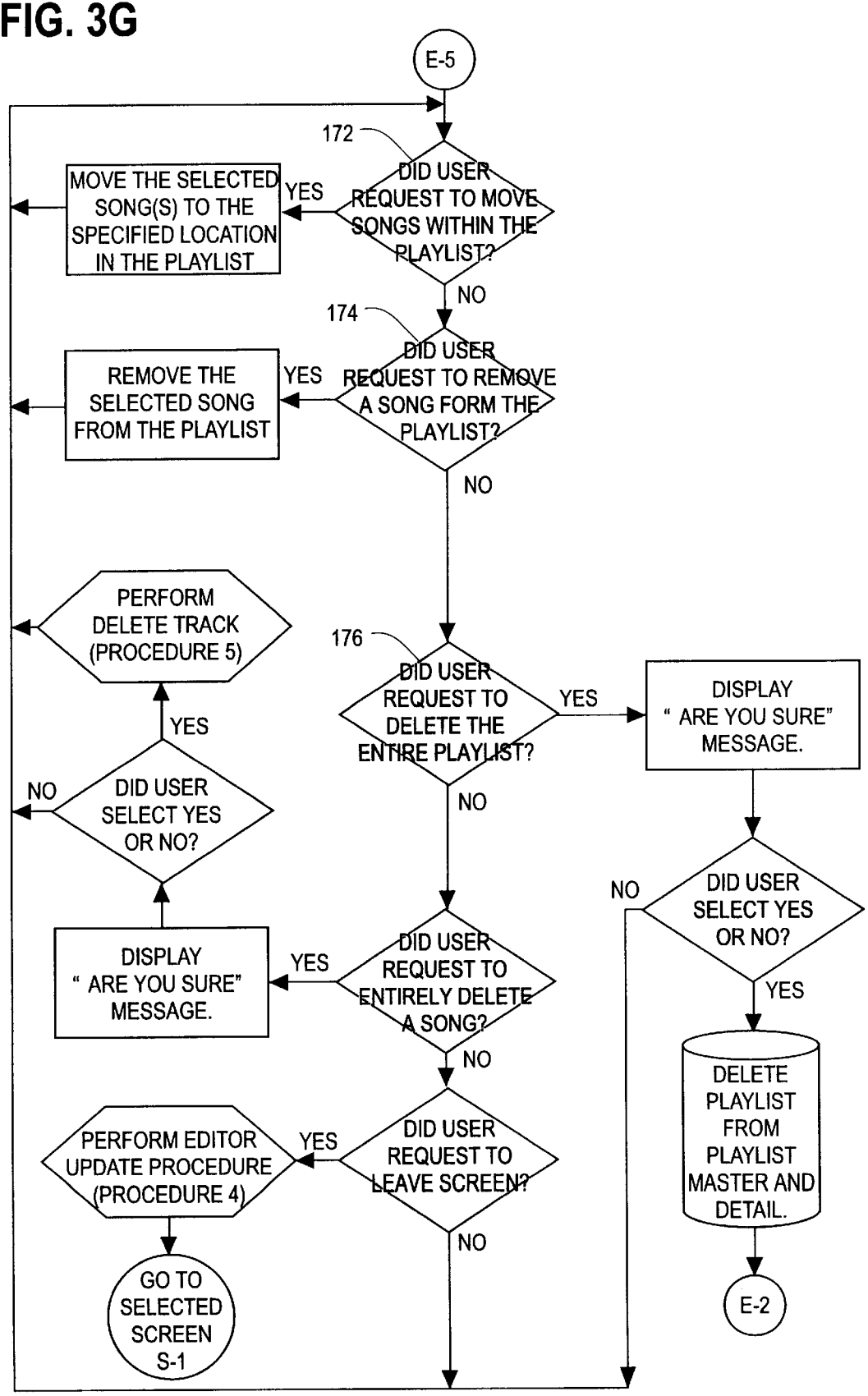
Figure 3H:
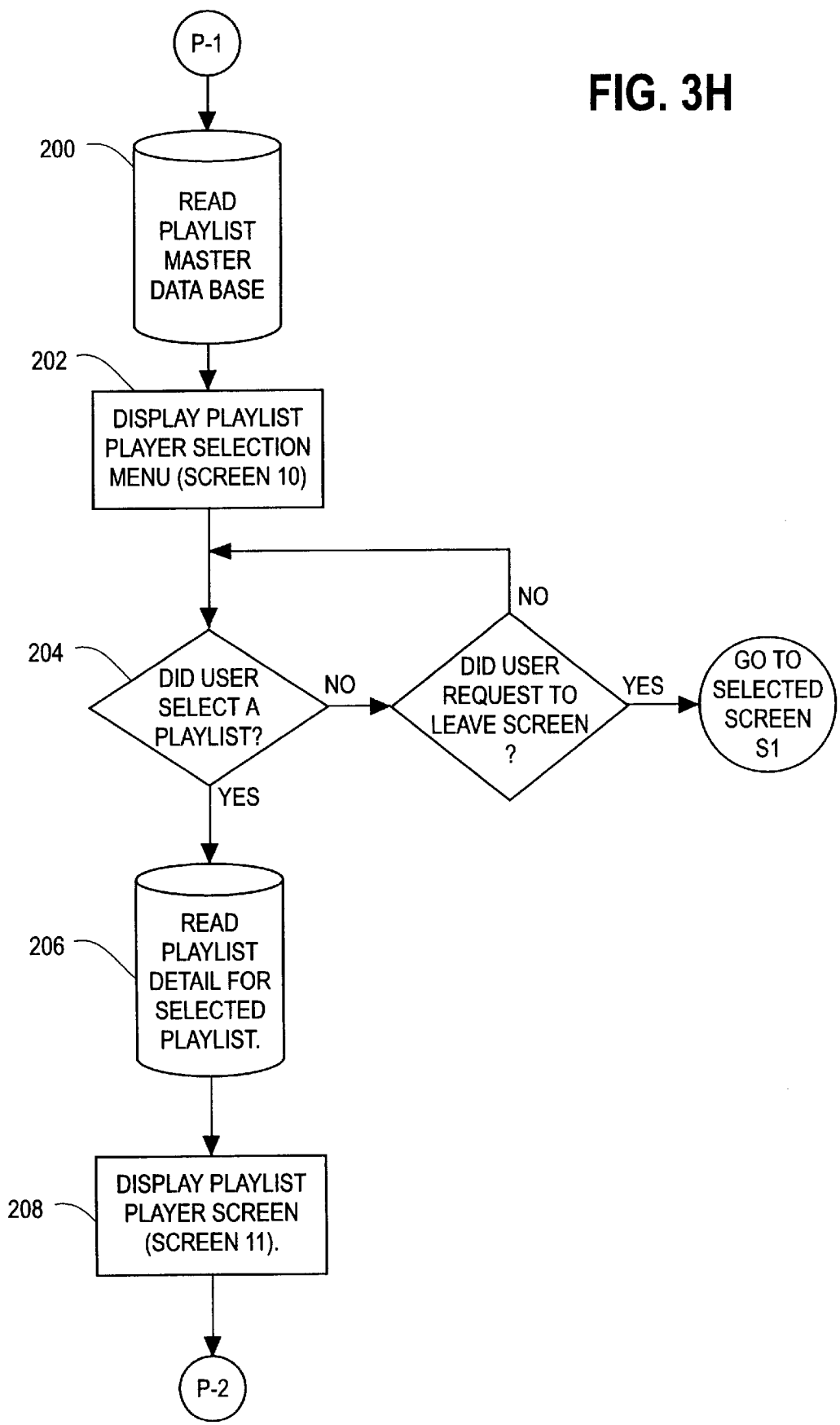
Figure 3I:
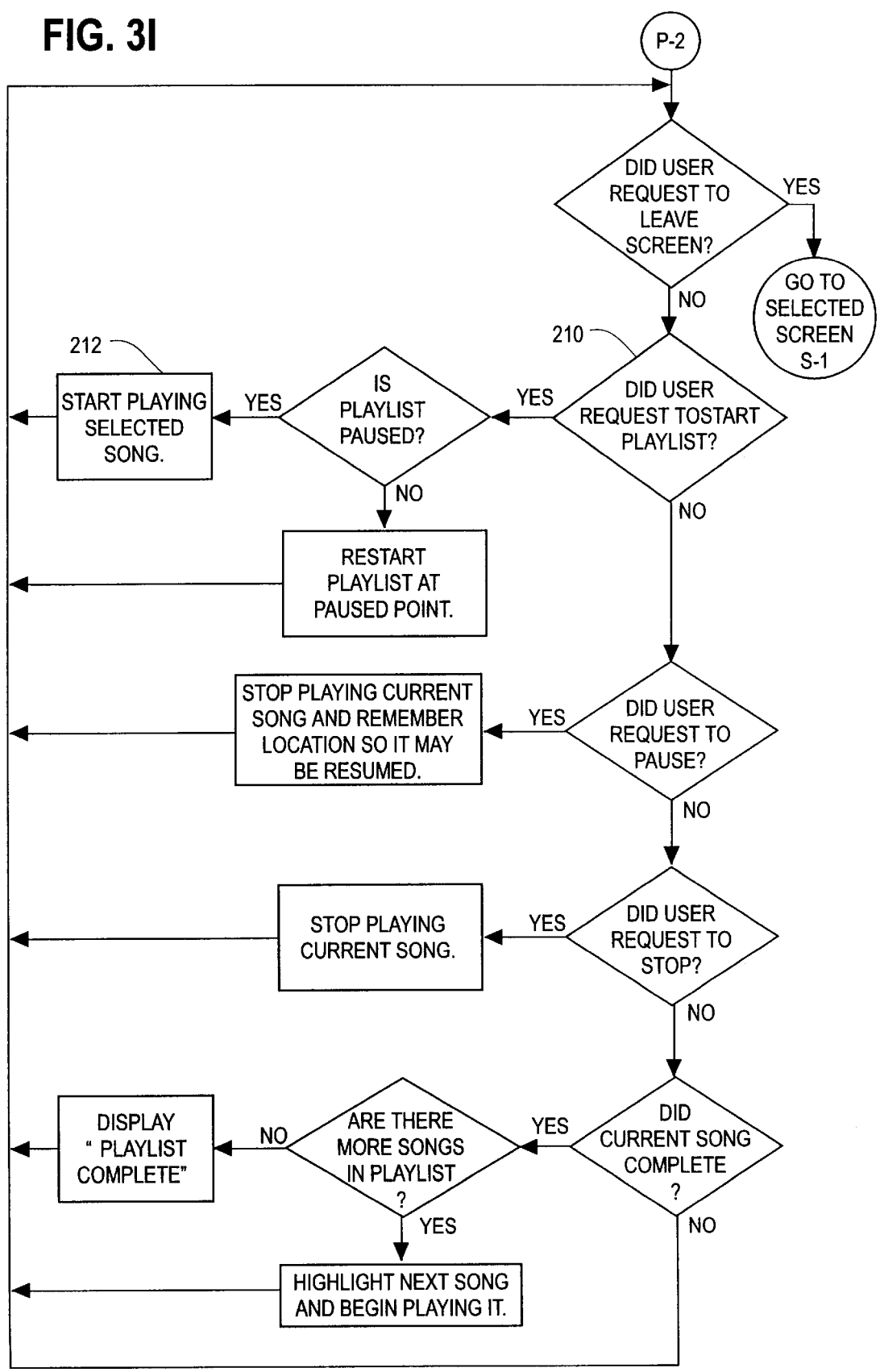

FIG. 3A illustrates the initial steps in reading a source of digitized works, such as a CD and in selecting either the record sequence, FIGS. 3B, 3C, and 3D, the list player sequence FIGS. 3H and 3I, or the playlist editor sequence FIGS. 3E, 3F and 3G. In step 100 a determination is made if a CD is present in the drive 12c. If so, the program 16 initiates record steps illustrated in FIGS. 3B, 3C and 3D. If not, the playlist master database is checked in a step 101. If playlists had previously been created, the playlist screen sequence is executed, FIGS. 3H and 3I in step 102. Alternately the editor sequence can be entered, FIGS. 3E, 3F and 3G in step 103.

Figure 4A:
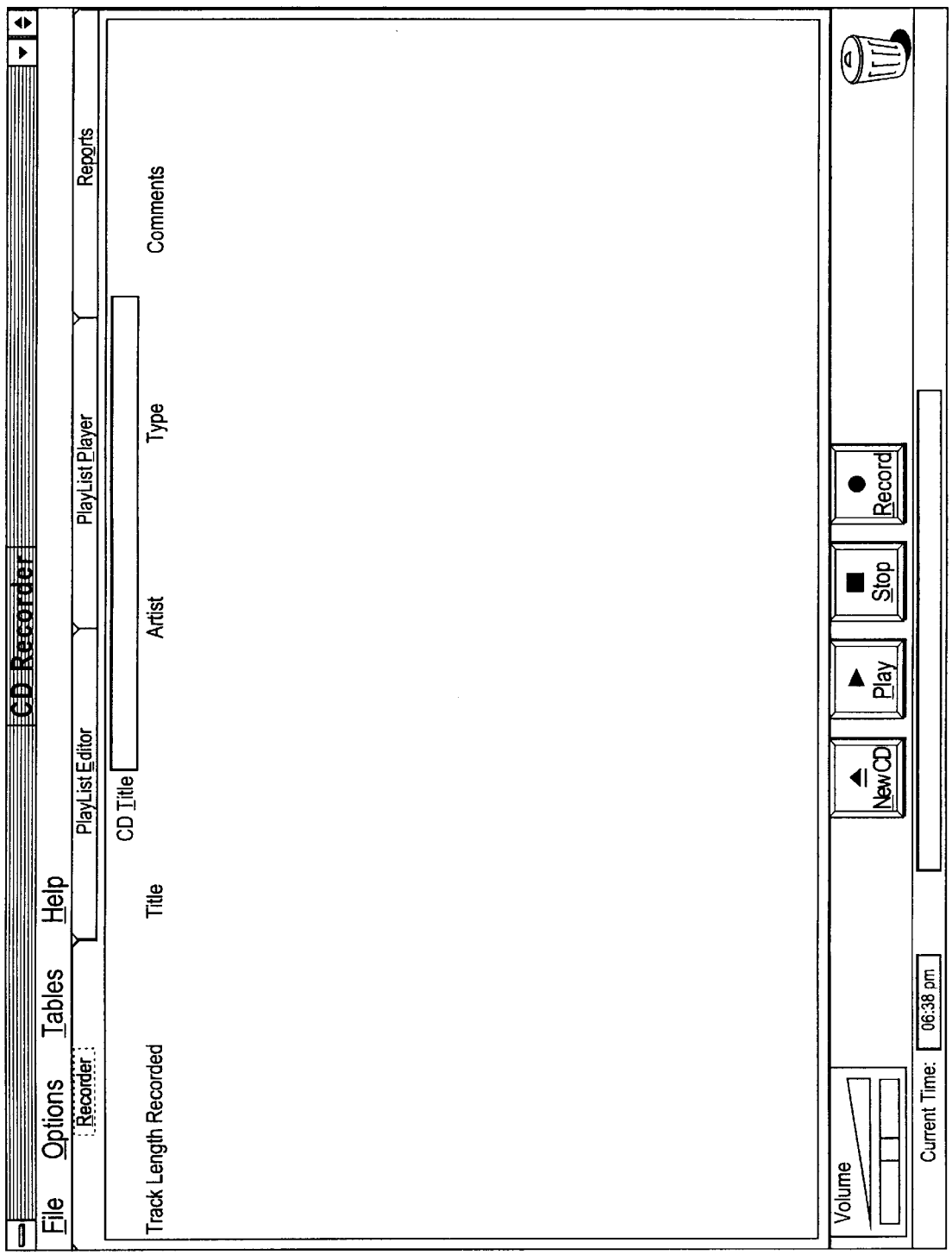
Figure 4B:
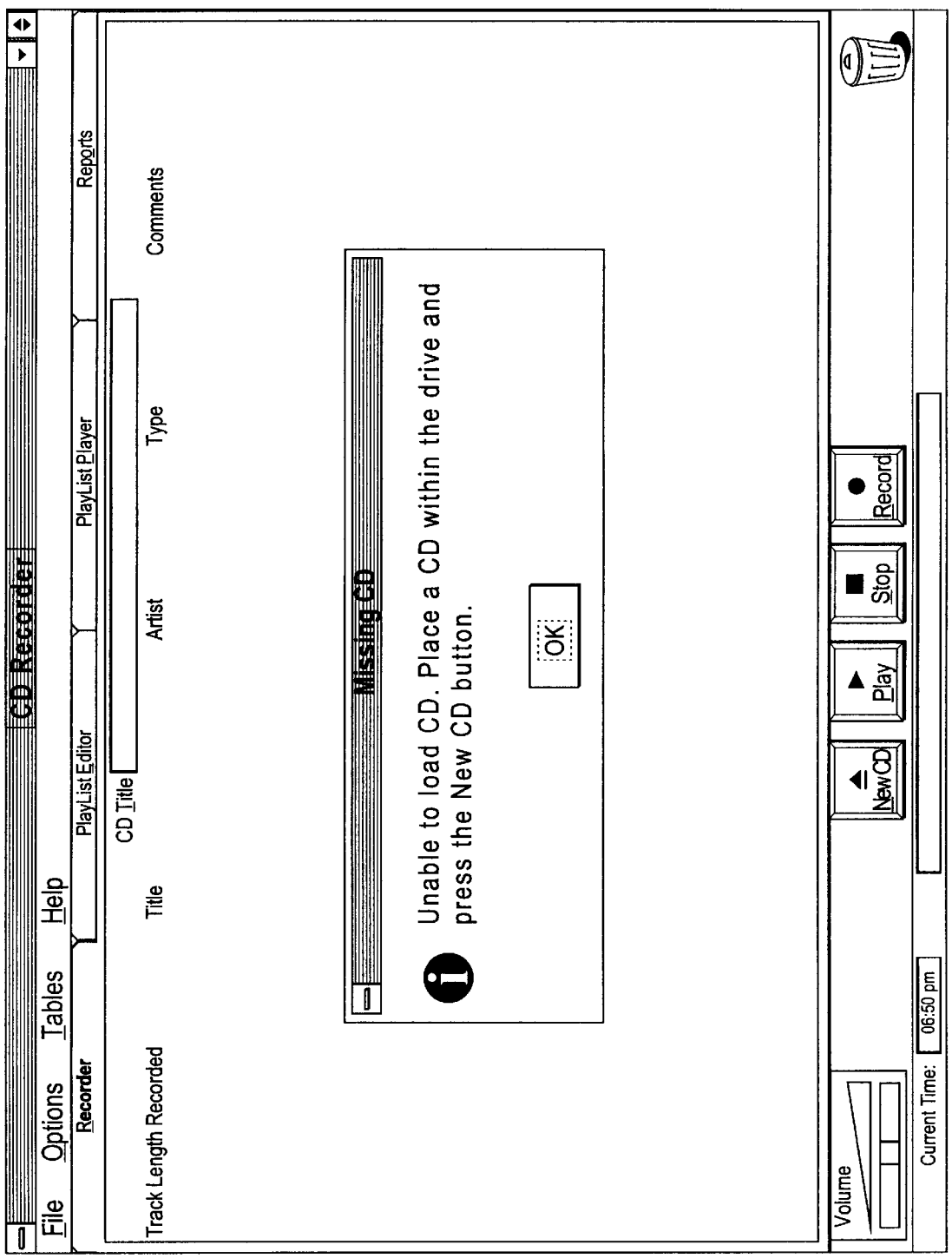
Figure 4D:
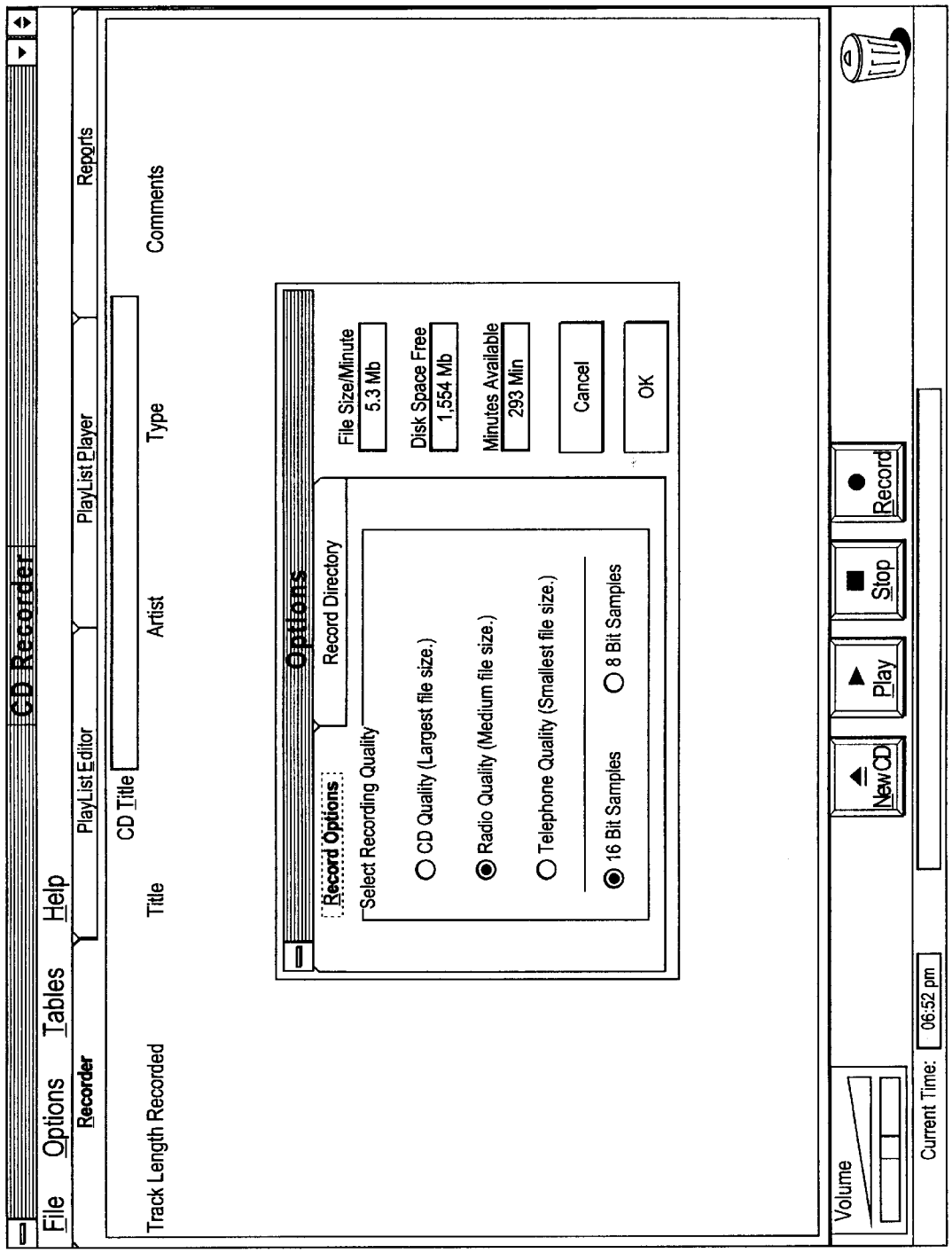
Figure 4E:
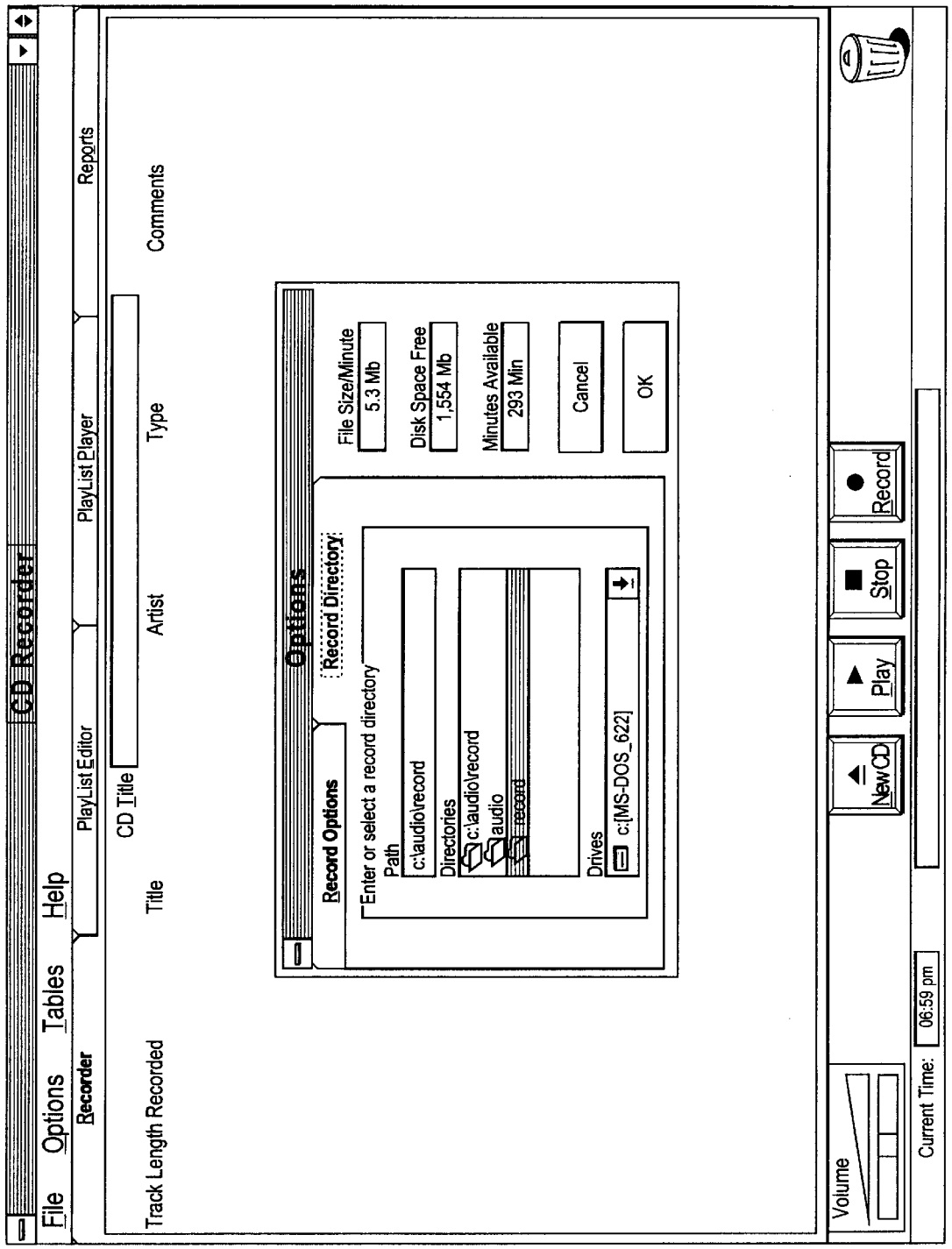
Figure 4F:
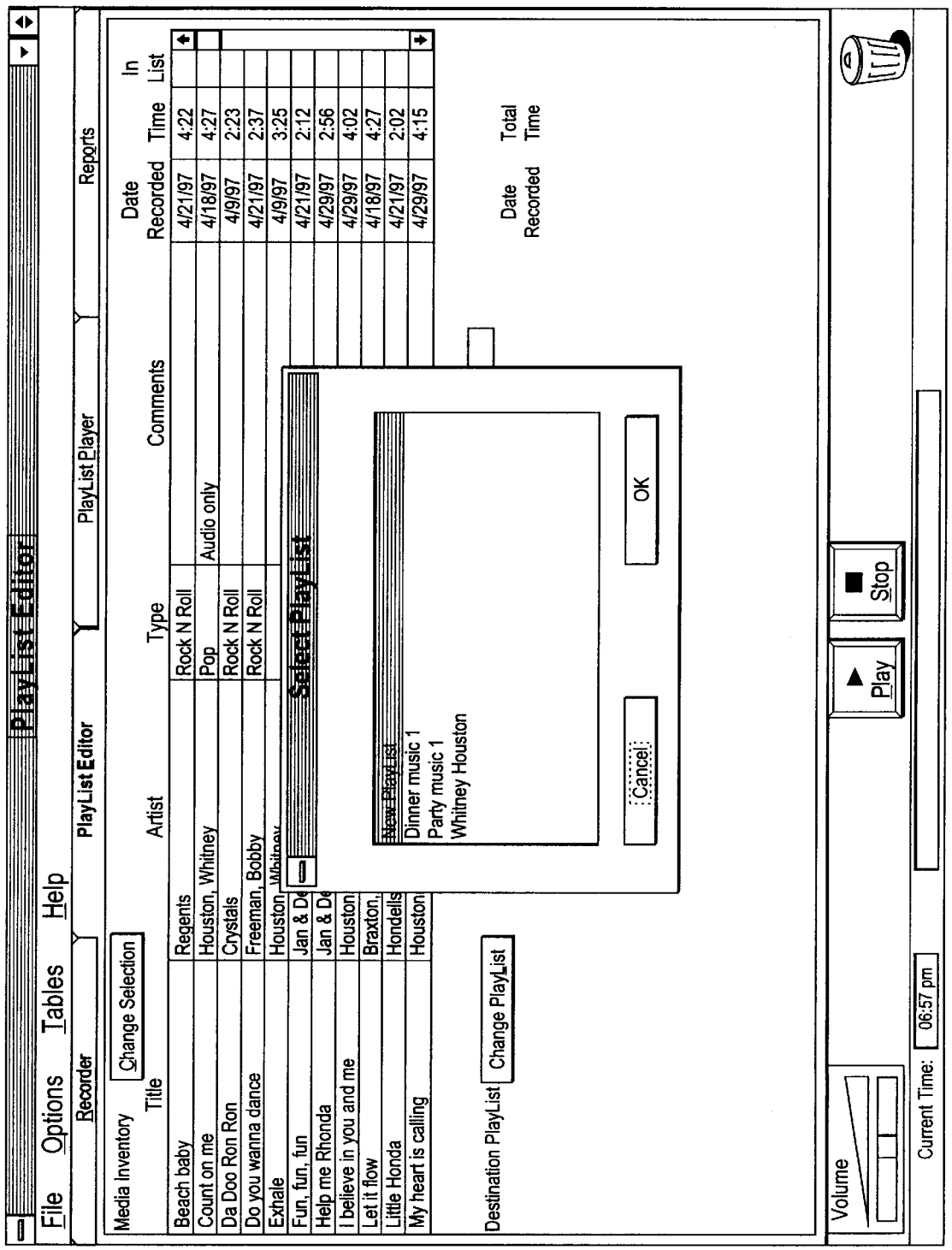

With respect to the record sequence FIG. 3B, during the process of recording information off of the respective CD, in a step 110 an initial screen, FIG. 4A is displayed. If the processor 12a determines in a step 112 that a CD is not present, then a CD missing display, FIG. 4B is presented in a step 113.

In the event that a CD is present, in a step 114, information will be read off of it as to track numbers and play times and displayed in a step 116 as in FIG. 4C. In a step 118, the master CD database is checked and if a corresponding record is found, in a step 120 the name of the CD is displayed, as indicated in FIG. 4C. Where tracks off of the respective CD had been previously recorded, in step 122, that information will be retrieved from the track database and displayed also as illustrated in FIG. 4C. The length of each track, recording date, title artist and type of work all can be displayed.

With respect to FIG. 3C and 3D, in a step 124 the control program 16 determines whether or not the user has selected a track to play. If so, the selected track is played in a step 126. If desired, as illustrated in a step 126a characteristics of the work such as beats per minute can be computed and displayed for the user.

In a step 128, the control program 16 checks to determine whether or not the user requested restart of a work at a specified point. If not the system determines in a step 130 if the user has selected one or more tracks to be recorded. If so, in a step 132, selected tracks are recorded.

The system control program 16 also determines whether or not the user has requested a deletion in a step 134 or requested that a new CD be loaded in a step 136, select options in a step 138, a tables function in a step 140 or an exit function in a step 142. In each of steps 136, 138, 140 and 142, the requested respective procedure is carried out.

Where a user has selected the edit screen, illustrated in FIGS. 3E, 3F and 3G, one or more pre-existing playlists can be retrieved and edited. In a step 150, a playlist selection menu is displayable by the control program 16, in accordance with FIG. 4F. Using the selection menu a particular playlist can be selected and the detail retrieved in a step 152 for the selected playlist. The selected playlist can be displayed for editing as illustrated in FIG. 4G in a step 154. For the convenience of the user, the editor screen, FIG. 4G, illustrates in an upper section, an inventory list of available works currently in inventory which can be selected and entered into the destination playlist, in the lower portion of the display illustrated on FIG. 4G.

Figure 4H:
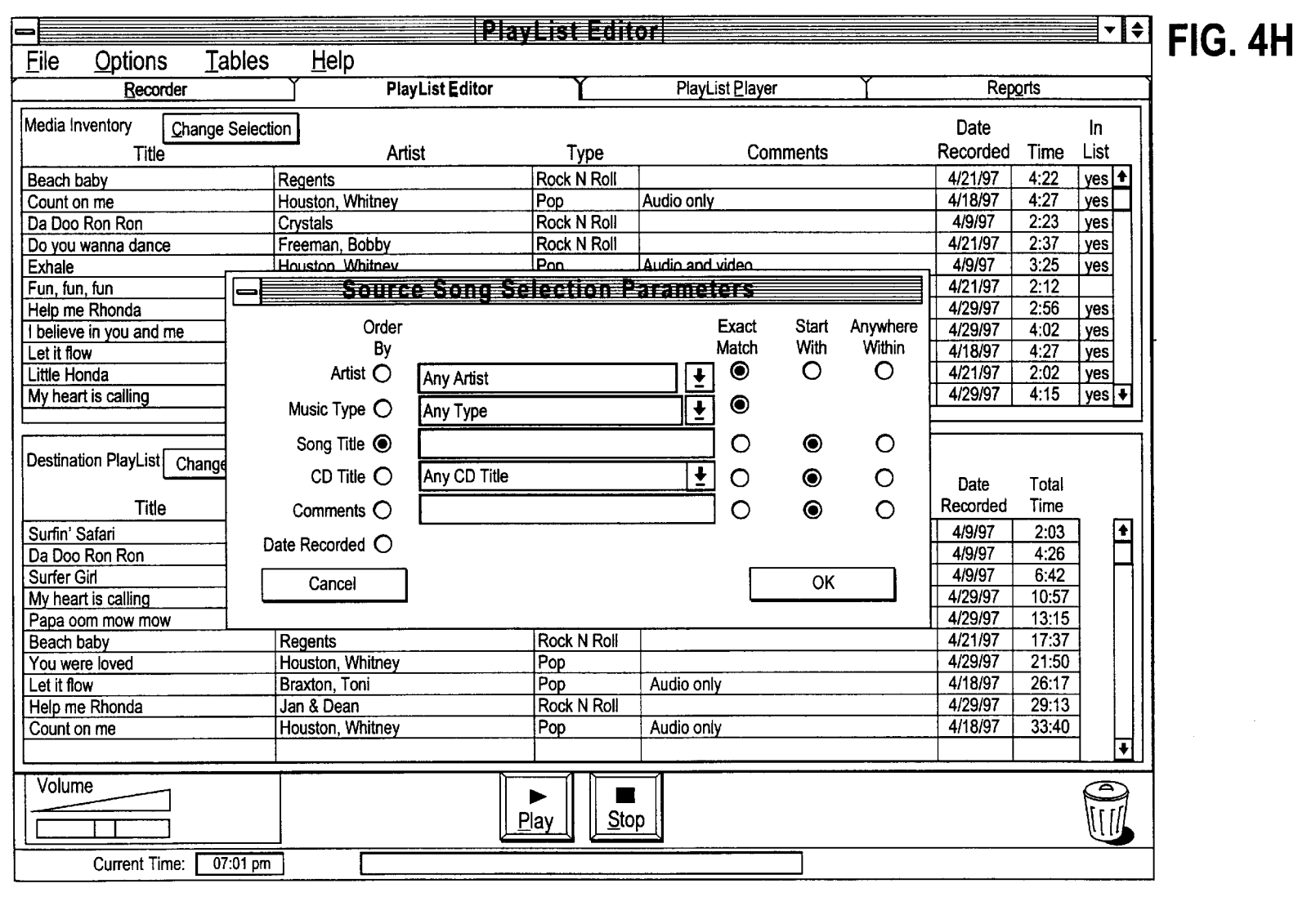

As illustrated in FIG. 3F, in a step 160, a user can edit or revise selections or the sequence of selections in the subject list using an editor selection screen as illustrated in FIG. 4H. In the event that the user requested a change in the play sequence in a step 162, an update procedure is executed in a step 164 corresponding to FIGS. 3D and FIG. 4I. It will be understood that standard editing-type functions will be available to the user as would be known to those of skill in the art.

In a step 166 the user can request that a particular selected work be played or presented. The works can be restarted in a step 168 at a particular point.

The user can insert a work or a song in playlist in a step 170. With respect to FIG. 3G, a work or song can be moved within the playlist in a step 172. A particular song or work can be removed from the selected playlist in a step 174. The entire playlist can be deleted in a step 176.

Figure 4J:
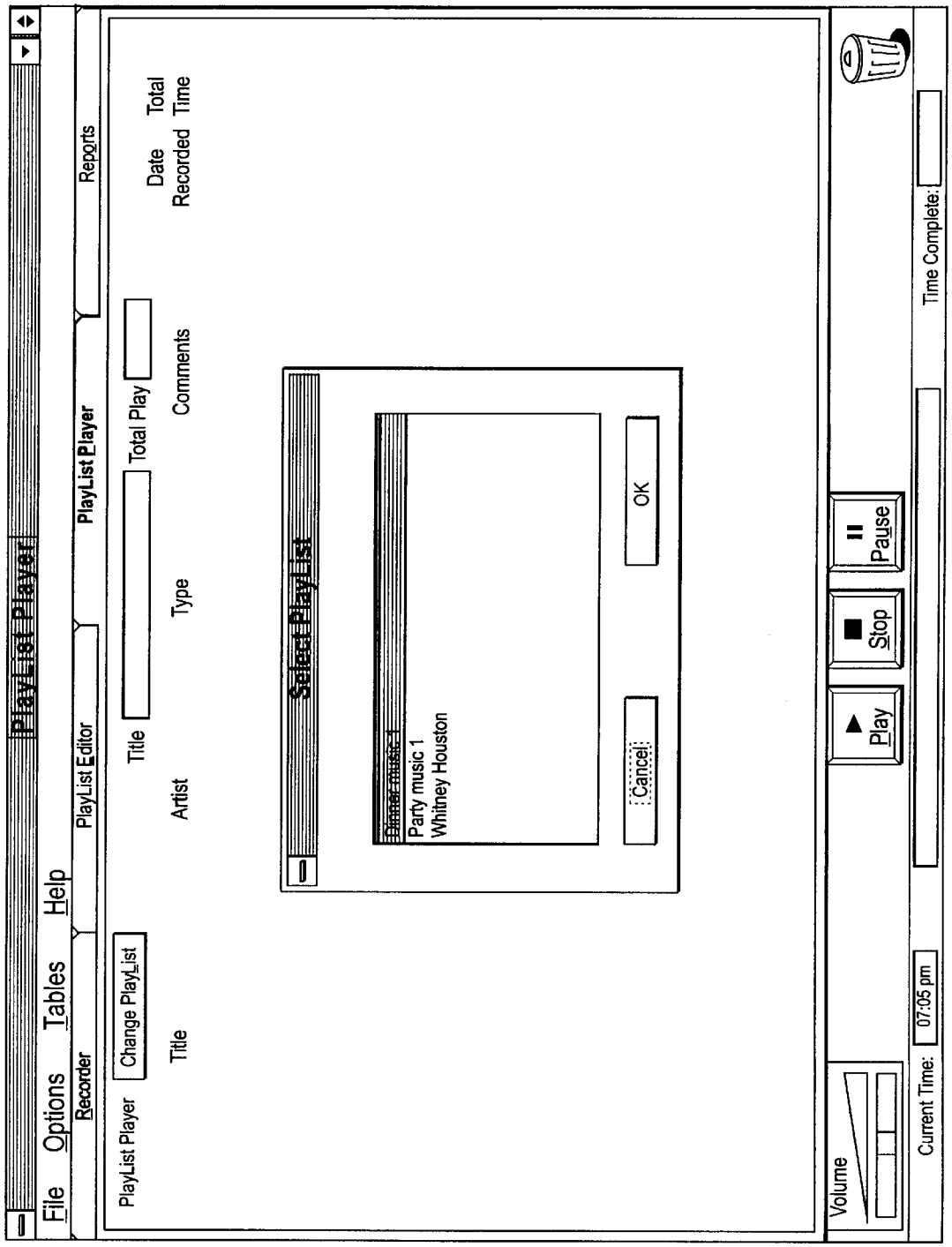
Figure 4K:
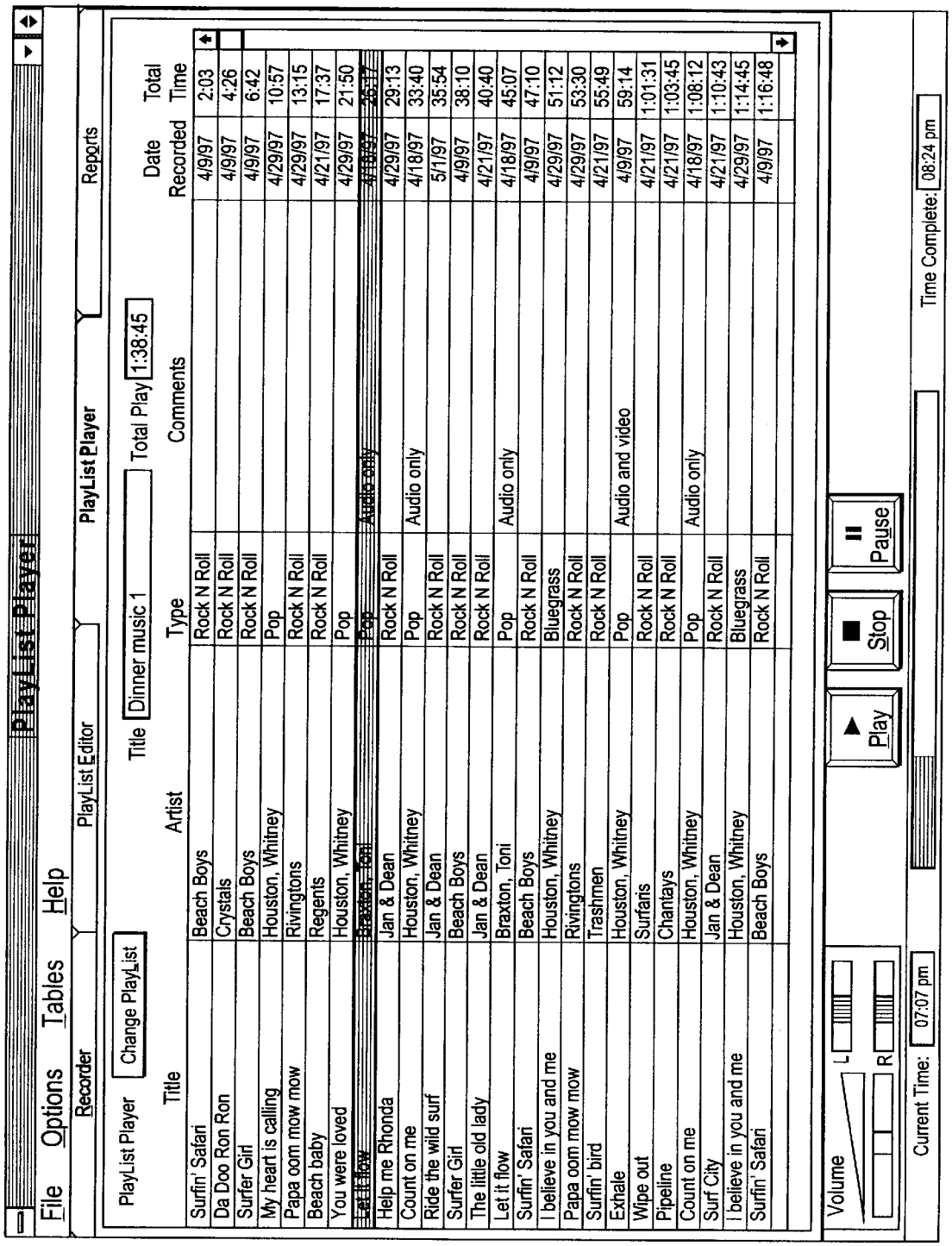

In the event that the user desires to select a particular playlist for execution, in a step 102, FIG. 3A, the playlist master database is read in a step 200, FIG. 3H. The playlist player selection menu FIG. 4J is displayed in a step 202. If the user selects a playlist in a step 204, the playlist detail is read from the appropriate database in a step 206. The selected playlist is then displayed, FIG. 4K, in a step 208.

With respect to FIG. 3I, the user can exit the player screen sequence or can request execution of the playlist in a step 210 at the beginning of the list or at a specified work or song. The list is then executed in a step 212.

Figure 3J:
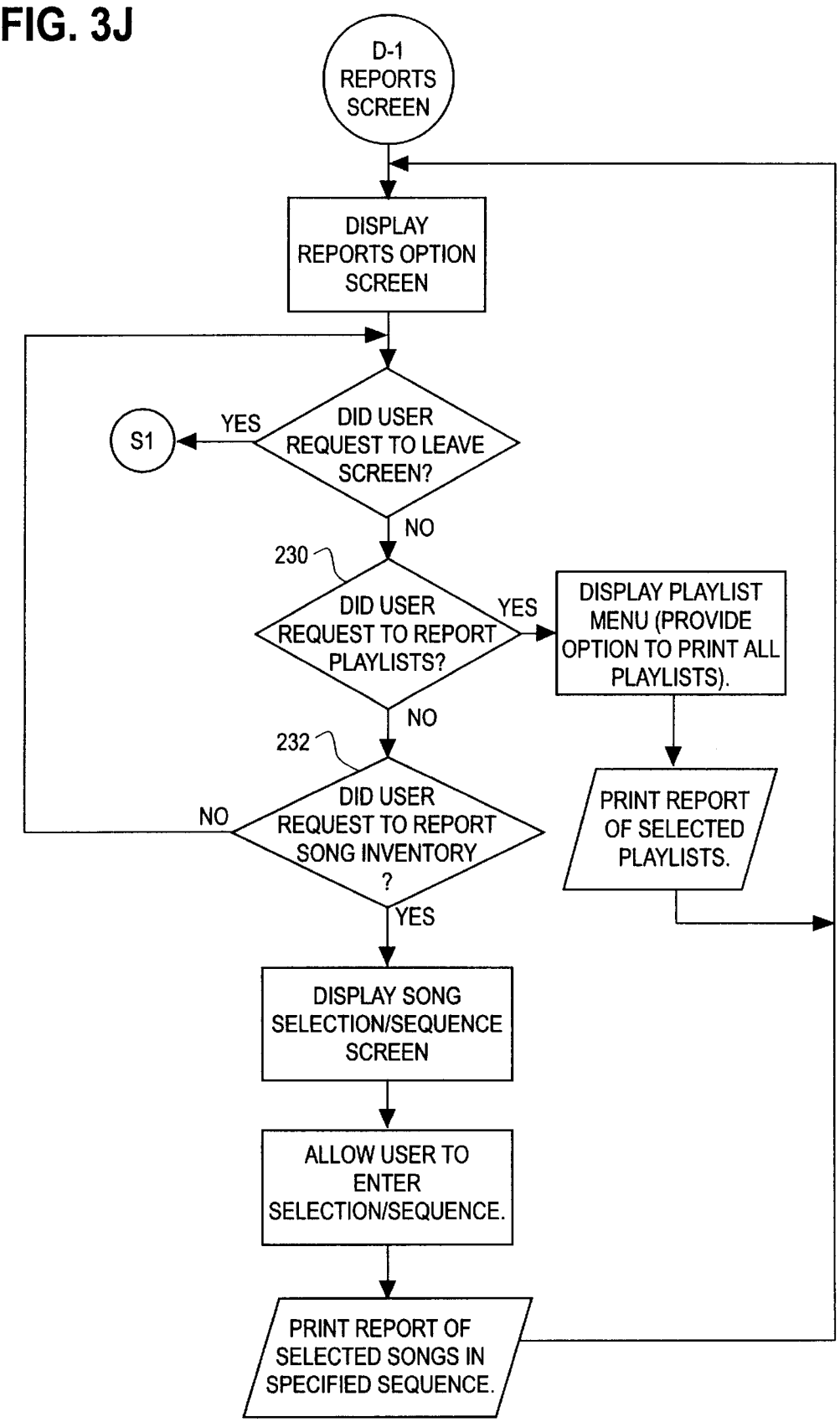

In the event that one or more reports are to be created using the printer 12g, the process of FIG. 3J can be used to request reports as to existing playlists in a step 230. Alternately, the user can request a report of the existing inventory of media elements in a step 232.

Figure 3K:
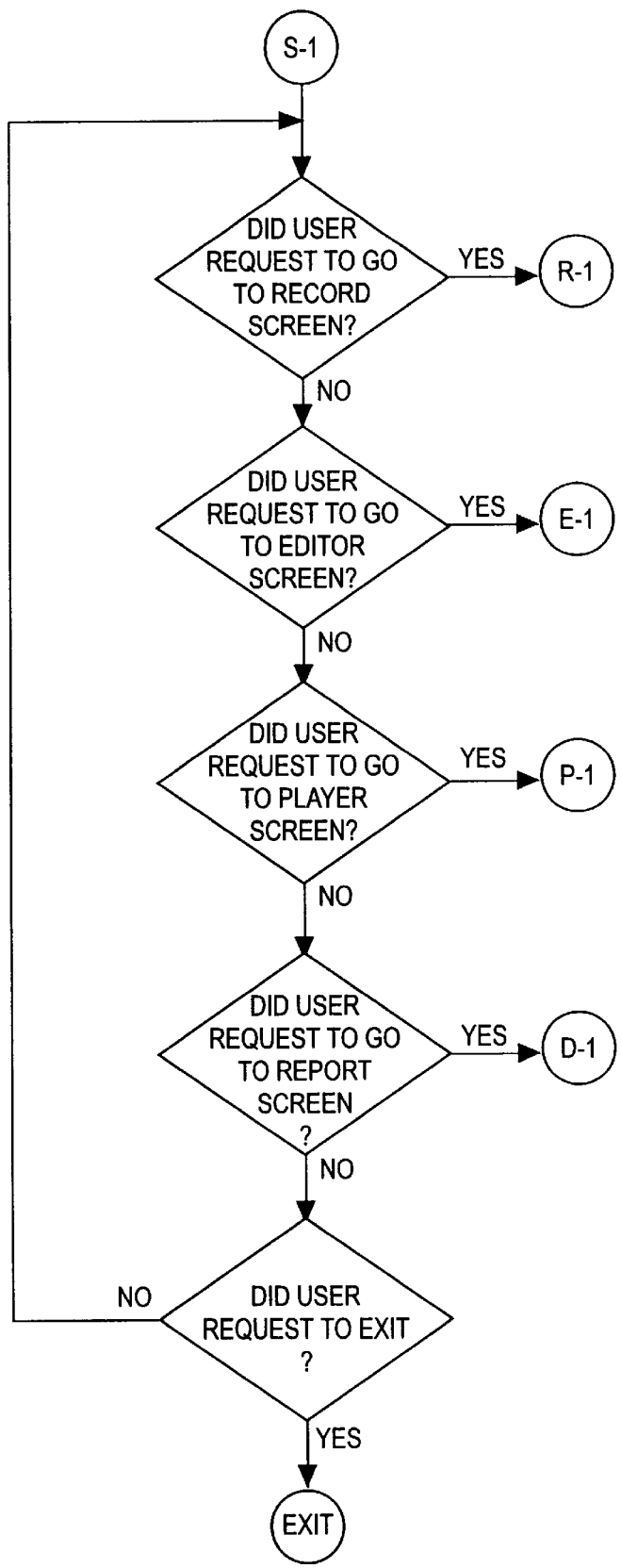
Figure 3L:
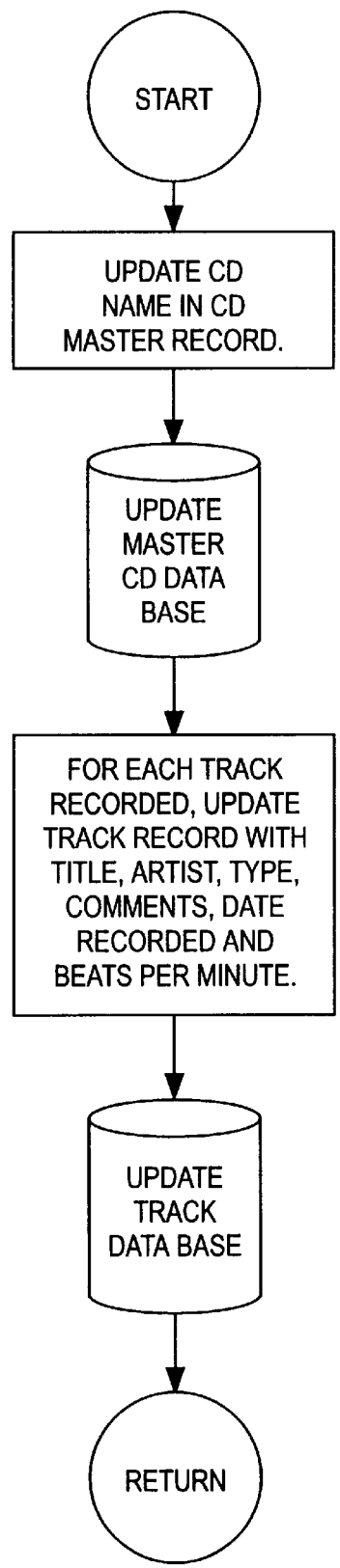

Screen selection is carried out in accordance with the process illustrated in FIG. 3K. Updating of data from the record screen is carried out in a process illustrated in FIG. 3L.

Figure 3M:
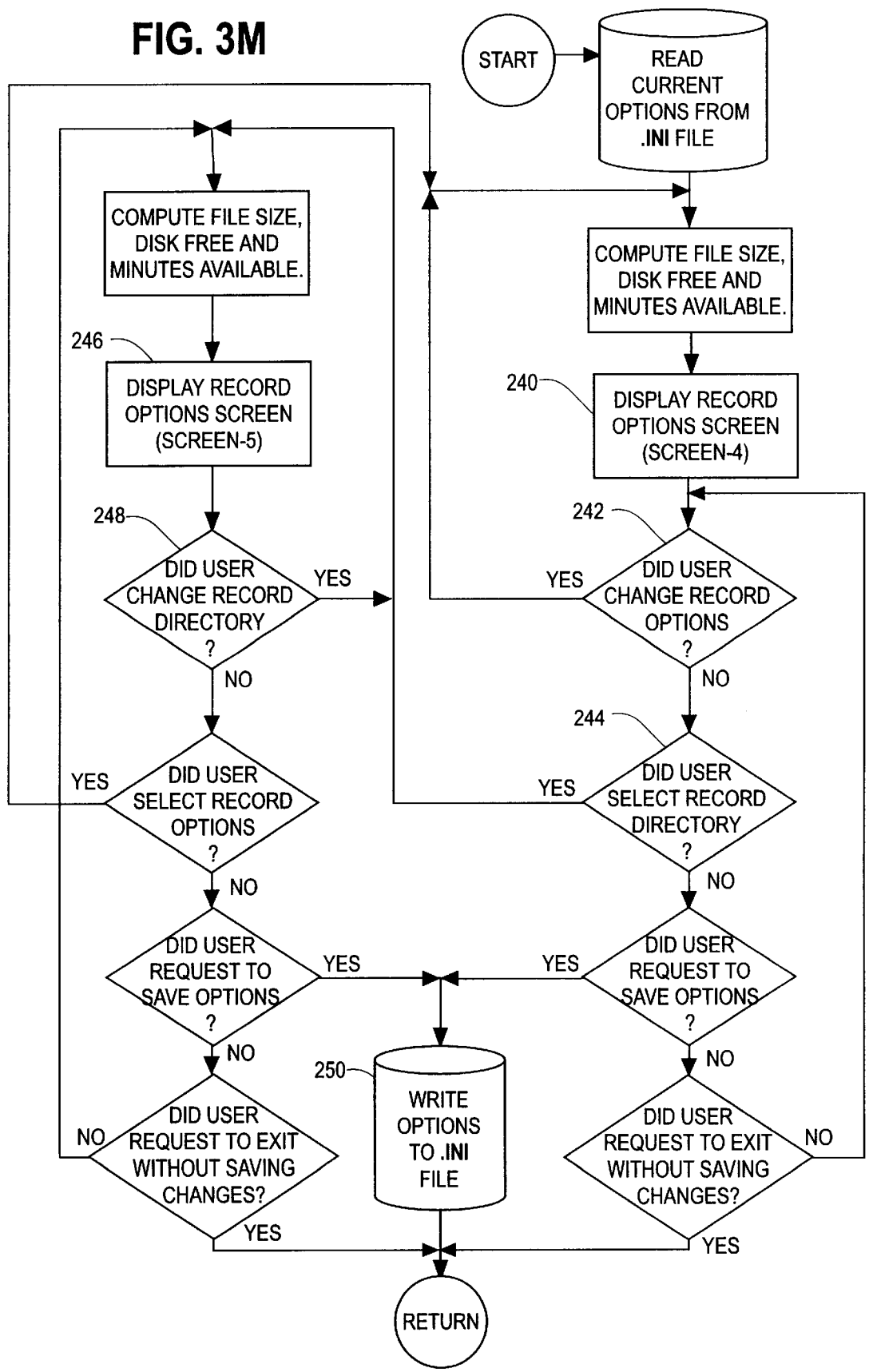

FIG. 3M illustrates steps associated with carrying out requests for various optional functions. For example, in a step 240 an option screen, FIG. 4D, can be displayed for a user.

The user can subsequently in a step 242 change the record options. In the event that the user in a step 244 selects a record directory, the record directory screen FIG. 4E can be displayed in a step 246. The displayed screen can be altered by the user in a step 248. The revised record options can be stored in a step 250 for subsequent use.

Figure 3N:
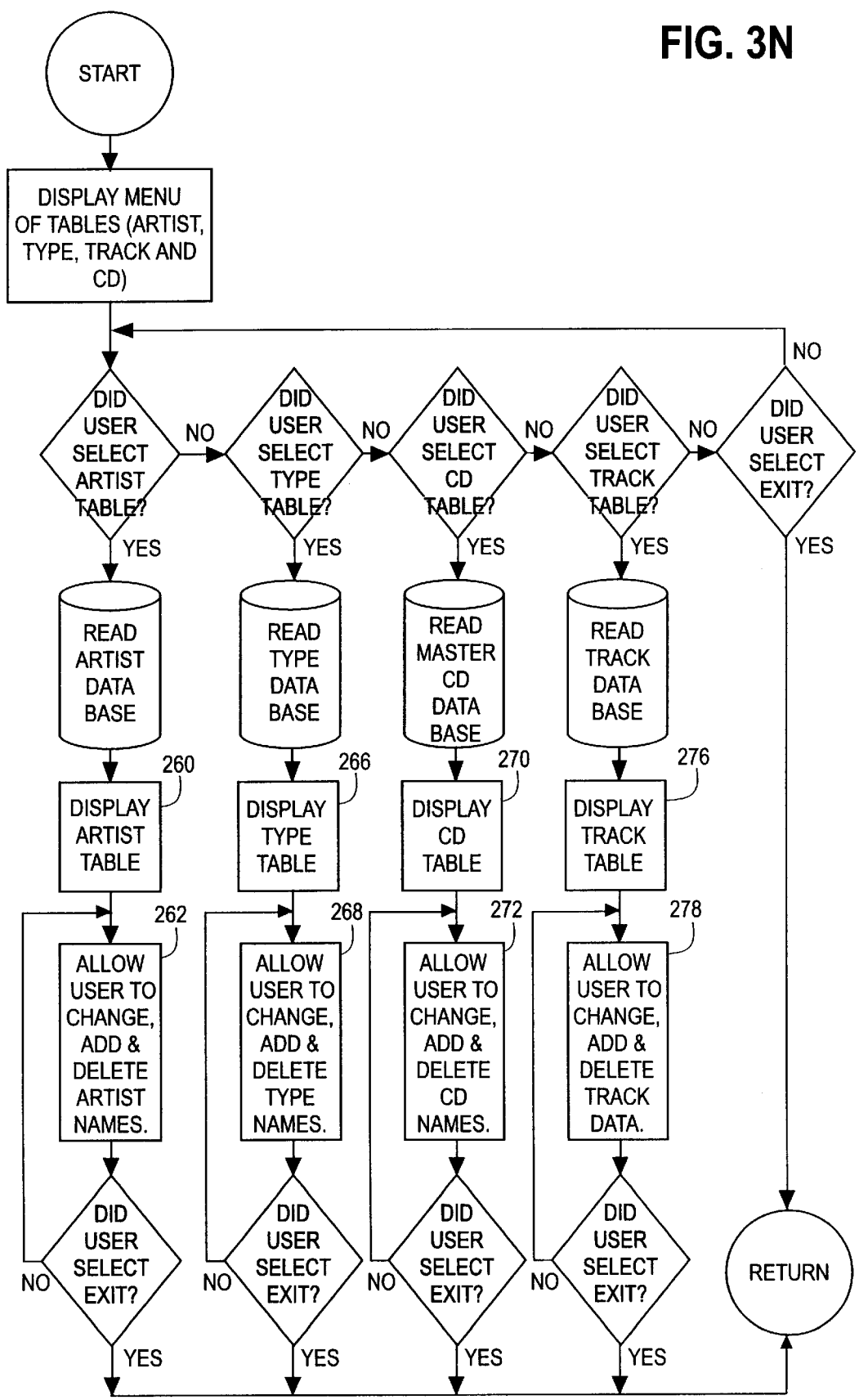
Figure 30:
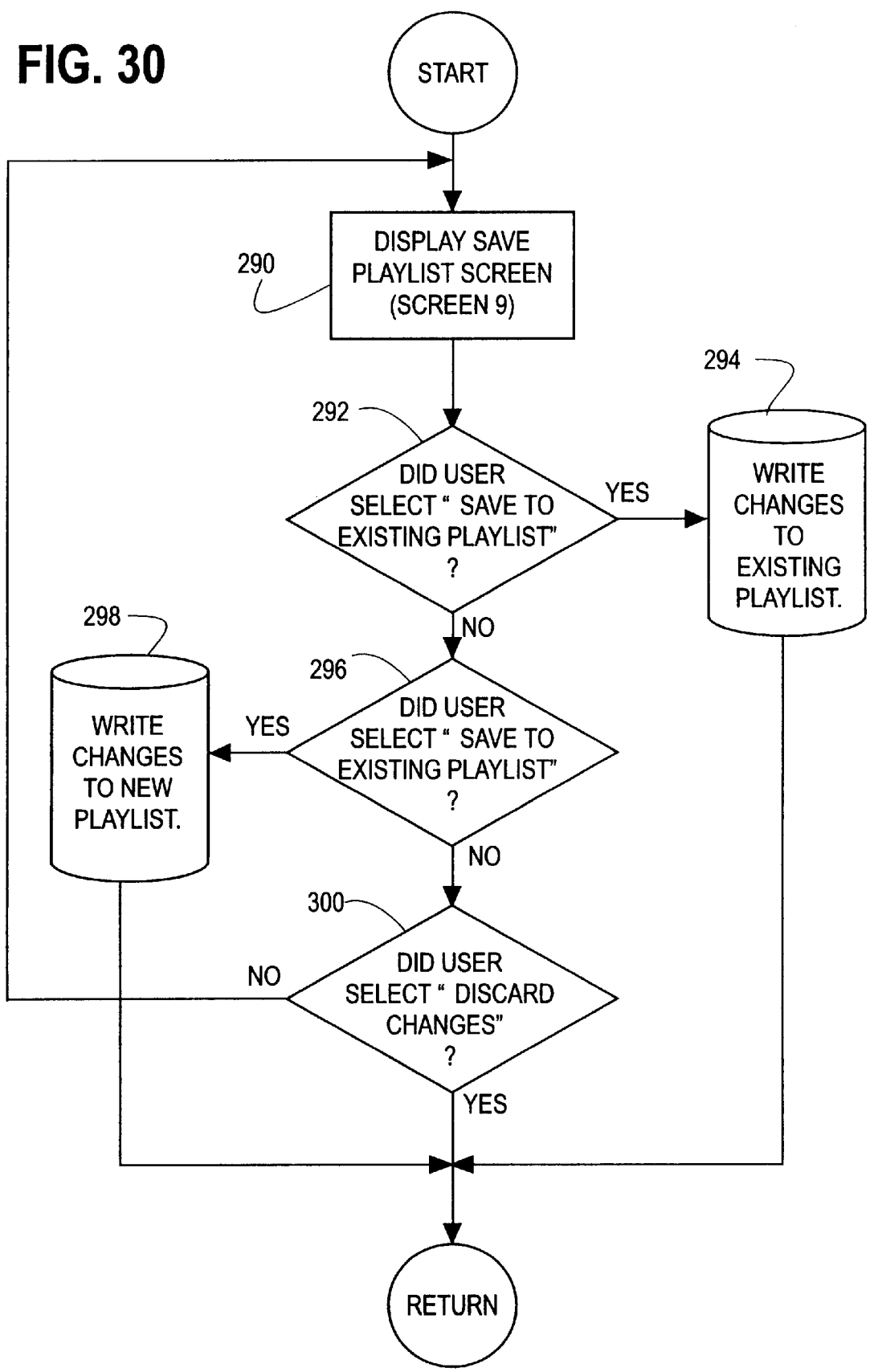

FIG. 3N illustrates steps of a process wherein the user is able to select and display various tables. In a step 260 an artist table can be displayed and edited in a step 262. In a step 266 the type table can be displayed and edited in a step 268. In a step 270, the CD table can be displayed and edited in a step 272. The track table can be displayed in a step 276 and edited in a step 278.

FIG. 3O illustrates the steps in a process of saving the playlist screen, FIG. 4I. In a step 290 the playlist save screen is displayed. In a step 292, if the user has selected to save the existing playlist, the changes are written to the respective database in a step 294. If the user elected to save the new playlist in a step 296, the changes are written to the new playlist database in a step 298. Finally, the user can discard the changes and exit in a step 300.

Figure 3P:

FIG. 3P illustrates the steps of a procedure for deleting a selected work or track.

Hence, as described above, the system 10' can be used to create new or modified playlists, and execute same thereby presenting the sequence of works to a user. Alternately, pre-existing playlists can be edited and additional new playlists created which then subsequently be executed.

Those of skill in the art will understand that other functions as illustrated in FIGS. 3A–3P will also be provided by the control program 16. Attached hereto is a preferred data structure for use with the flow diagrams of FIGS. 3A–3P.

Figure 5:
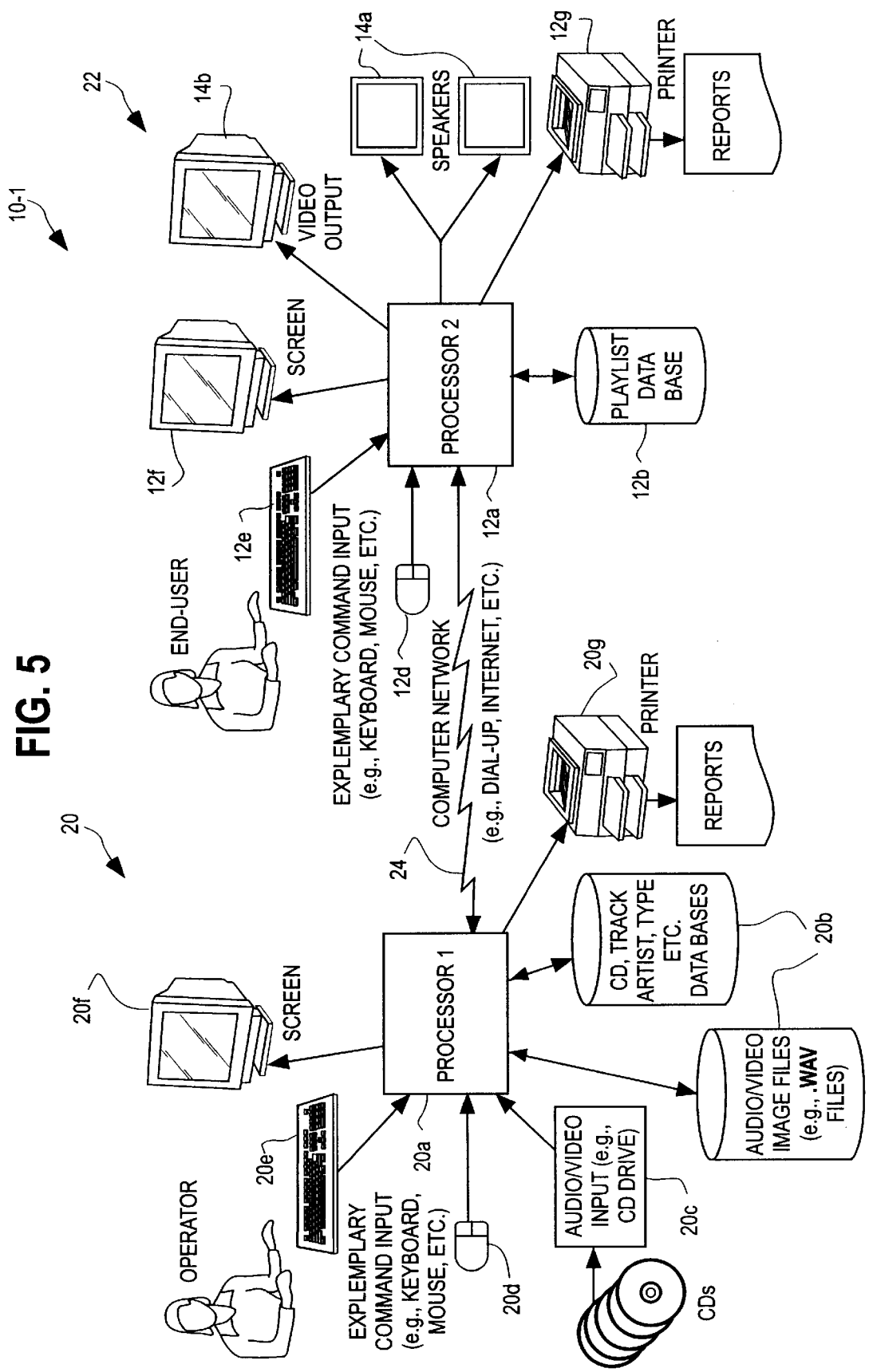
FIG. 5 is a block diagram of a system intended to receive audio or visual works from a remote source.
Figure 6:
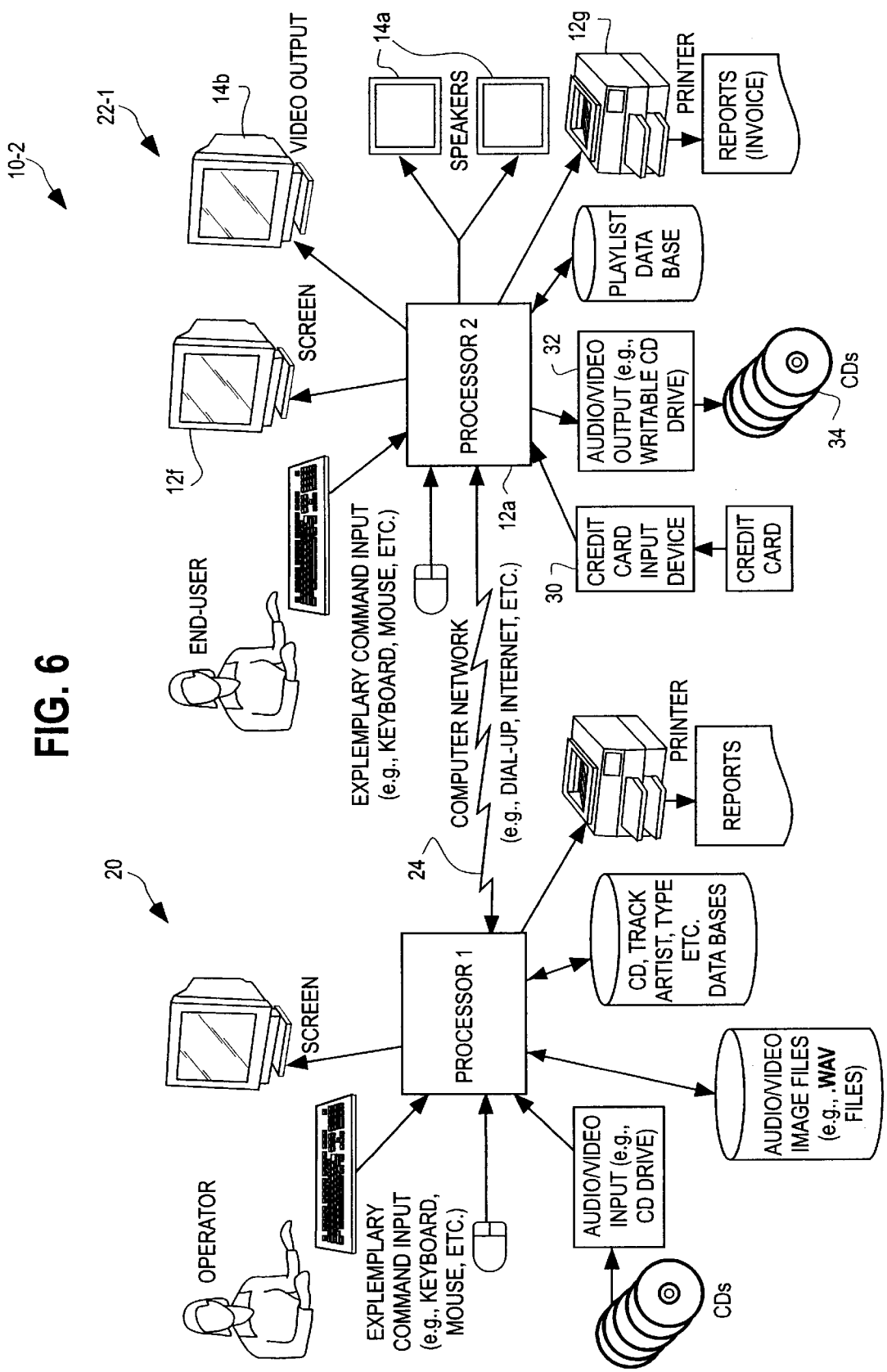
FIG. 6 is a diagram of a system intended to provide a custom written medium of works obtained from a remote source and in response to establishing a predetermined credit.
Figure 7:
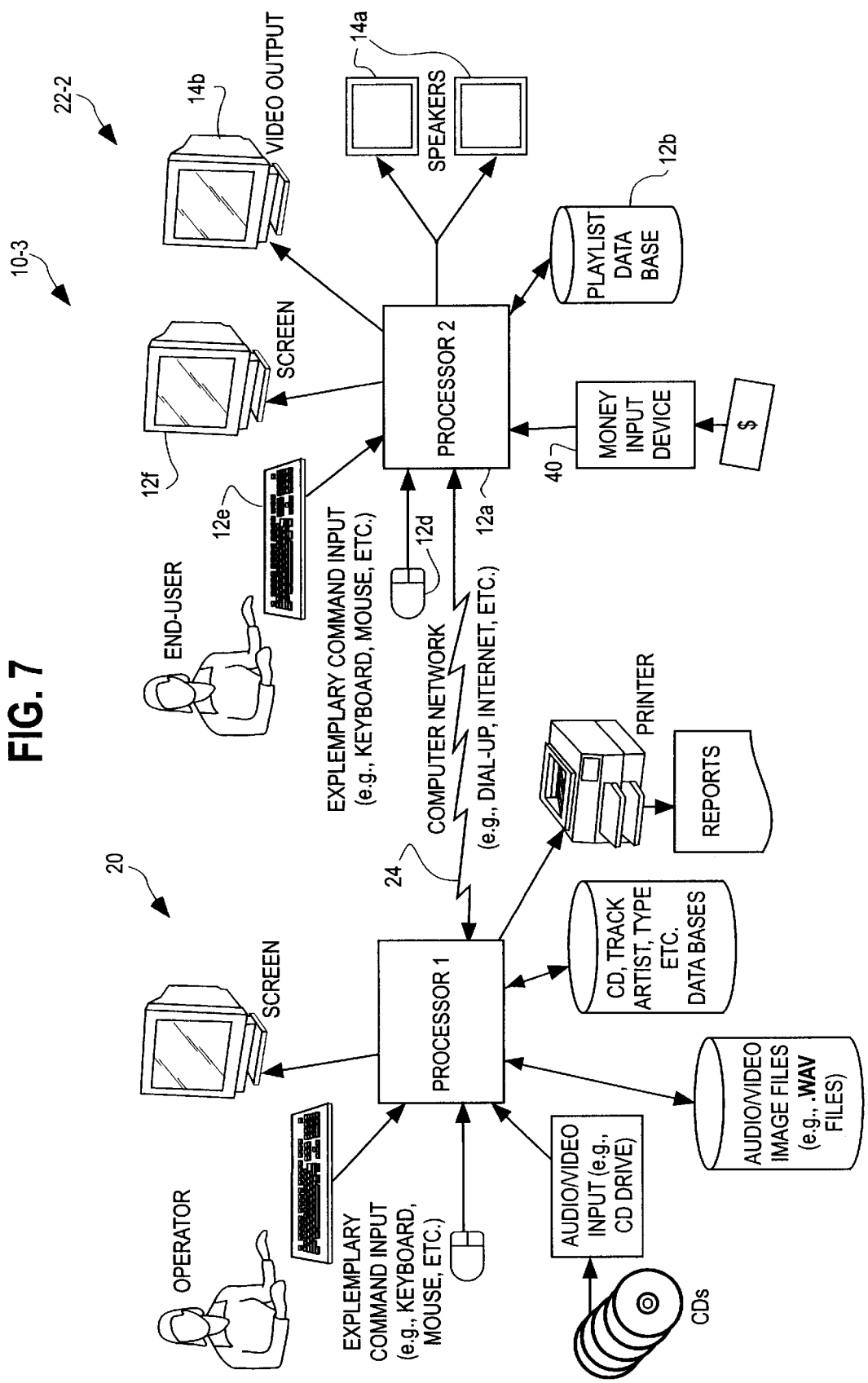
FIG. 7 is a diagram illustrating a system for presenting works on demand from either a local or a remote source.

FIGS. 5 through 7 illustrate alternate types of list building systems. FIG. 5 illustrates a system 10-1 which is a network based playlist creating and executing system. The system 10-1 incorporates a remote source 20 of works which are to be assembled and played or presented at a user's unit or terminal 22. The unit 20 is intended to be an element or a location accessible via a network. For example, the unit 20 can be a location on an internet or the internet or any other network. It can be accessed via a land line or wireless communication link 24 without limitation.

The system 20 incorporates a processor 20a, and databases 20b. The databases 20b include stored digital representations of a variety of works which can be obtained off of local drives, such as the drive 20c without limitation. The remote system operator has available standard input control devices such as mouse 20d, keyboard 20e or other desired input devices. A display screen 20f of the conventional variety is also provided. The remote system 20 also includes an optional printer 20g for purposes of creating hard copy reports for invoicing, billing or royalty payment purposes without limitation.

The system 20 provides a remote pre-stored inventory which the unit 22 can access via communication link 24. The unit 20 provides supervisory and billing services in response to requests by the end user's unit 22 for access to one or more of the works stored in the inventory in the databases 20b.

Subsequent to the request being authorized, the selected works can be made available to the terminal 22 via the communication link 24. The unit 22 can in turn be used as described previously to create new playlists, edit existing lists and then execute the lists under the control of the local end user. The terminal 22 is especially convenient for the end user in that the works can all be acquired electronically and there is absolutely no need for acquiring and keeping a plurality of CDs.

If desired, processor 12a in system 10-1 can keep track of the number of plays and total play time and transmit that information to processor 20a, for billing purposes. Reports producible by the processor 20a include total plays and play time along with invoices for end users. Documentation for royalty payments to the appropriate recipients can also be created. Finally, the reports can list those works by demand or popularity by day, week or month.

FIG. 6 illustrates a system 10-2 which includes a remote source, such as the remote source 20 and a local terminal 22-1. Terminal 22-1 includes elements similar to the terminal 22 previously discussed. Corresponding elements are identified with the same identification numeral.

The terminal 22-1 additionally includes a credit establishing input such as a credit card reader 30. The reader 30 can be used by a user to make a credit card account number available to the terminal 22-1 for billing purposes.

Once a credit line has been established, the user will be able to use the terminal 22-1 to create and/or modify one or more playlists into write the selected media elements via an output drive 32 to a removable medium 34 which could be a CD or a DVD.

The terminal 10-2 could be located in a business establishment and users interested in obtaining a custom combination of works can access the services of the terminal 22-1 via the reader 30 for purposes of creating and writing the desired sequence of works on the medium 34. Other services made available by the terminal 22 can also be made available by the terminal 22-1 in response to the established credit line.

Additional services that can be made available by the terminal 22-1 include printing invoices via the printer 12g. Report information can be transmitted to the system 20 for billing purposes with respect to the commercial establishment where the terminal 22-1 is located as well as making royalty payments to appropriate recipients.

FIG. 7 illustrates an alternate system 10-3 which can be used for entertainment purposes in public establishments. The system 10-3 provides jukebox-like services at the terminal 22-2. These are under the supervision and control of remote system 20.

The terminal 22-2 includes a credit establishing device which could be a coin or a bill receiving unit 40 of a type used with vending machines. Alternately, the unit 40 could also accept credit cards if desired.

Upon establishing an appropriate credit via the unit 40, the terminal 22-2 enables a user to select one or more works whose titles might be displayed on the control screen 12f via the input devices 12d, 12e.

The selected works could be resident at the local database 12b or could be acquired from the remote unit 20 via the communication link as discussed previously. The system 22-2, unlike conventional jukeboxes, has an unlimited selection of audio or audio/video works available to it via communication link 24. In addition, for security purposes, the terminal 22-2 does not include an inventory of valuable CD or DVD media. The works could include audio works, such as music, audio/visual works such as advertisements, music videos or others.

The terminal 22-2 presents a rolling playlist on the screen 12f which can be reviewed by the end user or individual selecting the works to be presented. Newly selected or identified works are added at the end of the playlist and are presented via speakers 12a and video output 12b in sequence depending on the nature of the work. Hence, the terminal 22-2 makes possible the presentation of arbitrarily selected works, in an arbitrary order in response to the credit established by the unit 40.

The remote system 20 via the link 24 monitors the works being presented and the frequency thereof. Billing information can be generated for purposes of charging the entity where the terminal 22-2 is located for each work which is presented. Reports can be produced at the system 20 identifying royalties to be paid to the appropriate recipients based on the works selected for presentation at the terminal 22-2 or for any other desired purpose. It will be understood that the appropriate file type would be used with the appropriate type of work.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

DATA STRUCTURE

| Table | Field Name | Data Type | |
|---|---|---|---|
| Master CD | CD Number | Long Integer | Created by the track times |
| | CD Title | Text 50 | |
| Track | CD Number | Long Integer | Link to Master CD table |
| | Track | Byte | Track number found on the CD |
| | Artist Code | Integer | Link to the Artist table |
| | Type Code | Long Integer | Link to the Type table |
| | Track Title | Text 50 | |
| | Track Time | Long Integer | Actual time recorded in seconds |
| | File Name | Text 255 | Path/File Naine of stored WAV file |
| | Beats | Integer | Beats per minute |
| Playlist Master | Number | Counter | Database assigned key |
| | Title | Text 50 | |
| Playlist Detail | Number | Integer | |
| | Play Order | Integer | Order the track was placed within the playbook |
| | CD Number | Long Integer | Link to Track table |
| | Track | Byte | Link to Track table |
| Artist | Artist Code | Counter | Database assigned Artist index |
| | Artist Name | Text 255 | |
| Type | Type Code | Counter | Program assigned index to Music Type |
| | Music Type | Text 50 | |

What is claimed:

1. A system for creating and editing play lists comprising:
   a graphical display;
   a data base for storage of a media inventory including at least audio items;
   a processor, coupled to the display and the data base with a plurality of instructions executable by the processor wherein some of the instructions present on one part of the display at least a part of a media inventory listing of at least the stored audio items, from which a user can select a plurality of items to be presented and wherein others of the instructions enable the user to select a named, prestored play list and display at least part of the selected list simultaneously on another part of the same display including additional instructions enabling the user to select at least one entry from the media inventory listing and insert the selected entry into the selected play list thereby creating a modified play list, including instructions enabling the user to save the modified play list and to designate a different, named, play list to be displayed on the same display and edited by the user.

2. A system as in claim 1 wherein the media inventory listing is pre-stored in the data base and including instructions for adding additional entries to the media inventory from at least one exterior source.

3. A system as in claim 2 which includes instructions for displaying a plurality of pre-stored play lists and enabling a user to select and execute from the data base one of the displayed play lists independently of the sources of the media entries in the selected list.

4. A system for building a plurality of play lists having entries selected from a pre-stored inventory wherein the members of the inventory can be obtained from different sources, comprising:

a data base for storing media items from different sources and a plurality of pre-stored play lists;

a play list editing system having a graphical display device and a plurality of instructions which enables a user to simultaneously display portions of an inventory of the stored items and portions of a selected play list on the same display device including editing instructions enabling a user to select a displayed inventory item and insert it into the displayed portion of the list thereby creating a modified list and additional instructions for storing the modified list in the data base and for subsequently displaying a plurality of pre-stored lists, each of which can be selected for execution.

5. A system as in claim 4 wherein the play list editing system includes a processor coupled to the data base and the display and wherein the instructions are executed by the processor and including input circuitry coupled to the processor whereby at least one media source can be coupled thereto.

6. A method of editing play lists based on a media inventory comprising:

creating a prestored data base of at least audibly presentable media items;

presenting visually at least a part of a preestablished play list based on some of the media items simultaneously while presenting visually, at least in part, a list of media items from the data base;

editing the play list by selecting at least one media item from the inventory list and inserting it into the play list at a selected location within the list thereby forming an enlarged play list.

7. A method as in claim 6 which includes displaying a plurality of selectable, named play lists.

8. A method as in claim 7 including presenting a selected list by retrieving at least some of the entries in the list from the data base.

9. A system comprising:

a user station which includes a first programmable processor and an associated control program for storing at least one previously created play list, and for retrieving and modifying existing entries of the stored list whereby an updated list to be executed can be created; and a communications link, coupled to the processor, at least intermittently, for receipt of at least some of the works specified by the updated list from a displaced source wherein the control program, in response to the entries on the updated list, downloads, from the source, via the link, and then presents at least some of the items on the list to a local user and wherein the control program maintains billing information for transmission to the source for billing the user.

10. A system as in claim 9 wherein the source includes a displaced inventory station having an inventory of items; and an inventory control processor coupled to the inventory, responsive to requests from the user station for transmitting requested items, via the link, to be presented by the first processor and for receiving billing information from the first processor.

11. A system as in claim 10 wherein the control program of the first processor graphically displays simultaneously at least a partial list of the available, displaced inventory and a selected, prestored play list.

12. A system as in claim 10 which includes a media writing element, coupled to the user station, whereby items received from the inventory or a local inventory at the user station can be written to a removable medium.

13. A system as in claim 10 wherein the control program of the user station also establishes a beats/minute parameter for selected items on the list.

14. A system as in claim 10 wherein the user station includes a media reader for incorporate locally read items into the list.

15. A system as in claim 11 wherein the control program includes an electronic display and instructions executable by the processor wherein some of the instructions present on one part of the display at least a part of a media inventory listing from which a user can select a plurality of items to be presented and wherein others of the instructions enable the user to select a named, prestored play list and display at least part of the selected list simultaneously on another part of the same display including additional instructions enabling the user to select at least one entry from the media inventory listing and insert the selected entry into the selected play list thereby creating a modified play list, including instructions enabling the user to save the modified play list and to designate a different, named, play list to be displayed on the same display and edited by the user.

16. A system for building a plurality of play lists having entries selected from an inventory which can be obtained at least in part, from different sources, the system comprising:

a data base for storing a plurality of user created pre-stored play lists;

a play list editing system having a graphical display and a plurality of instructions which enables a user to simultaneously display portions of an inventory of the stored items and portions of a selected play list including editing instructions enabling a user to select a displayed inventory item and to insert it into the displayed portion of the list thereby creating a modified list and additional instructions for storing the modified list in the data base and for subsequently displaying a plurality of pre-stored lists, each of which can be selected for execution.

17. A system as in claim 16 wherein the play list editing system includes a user processor coupled to the data base and the display and wherein the instructions are executed by the processor and including input circuitry coupled to the processor whereby at least one entry supplying source can be coupled thereto.

18. A system as in claim 16 which includes a communications link for downloading at least some members of a selected play list to be presented.

19. A system as in claim 16 wherein the editing system includes a user processor coupled to the data base and a control program for establishing a beats/minute parameter for items on a list selected for execution.

20. A system as in claim 16 wherein the editing system includes a processor coupled to the data base and a control program which maintains billing information on the number of plays and total play time for billing.

21. A system as in claim 1 which includes a communications link for acquisition from a displaced source of at least some of the media items on a play list selected for execution.

22. A network based system comprising:
 a user terminal that includes a programmed processor with a communications link for acquiring from a remote inventory media items to be presented;
 a play list editor for creating and editing multiple play lists;
 a storage unit coupled to the processor for storing the play lists wherein the processor, via the link, downloads media items from the remote inventory to be presented to the user, and wherein the processor can provide billing information via the link to a billing processor.

23. A system as in claim 22 which includes an output device, coupled to the processor, for writing one or more acquired media items to a local, removable medium.

24. A system as in claim 24 which includes at least one of a visual and an audio output device, coupled to the processor for presenting one or more acquired media items to a user visibly and/or audibly.

25. A system as in claim 21 wherein the processor includes instructions for logging numbers of plays or total play for billing.

26. A system as in claim 9 wherein the works are selectable from a class which incudes audio works, and video works.

27. A system as in claim 9 wherein the control program sorts items in accordance with a selected respective, parameter.

28. A system as in claim 27 wherein sorting of selected audio works is based on tempo.

29. A method of editing as in claim 6 wherein the media items are stored in a common data base.

30. A method as in claim 6 wherein selected audibly presentable media items are sorted, in accordance with a predetermined parameter.

31. A system as in claim 16 which includes a control program for analyzing at least one selected characteristic of items in a play list.

32. A system as in claim 31 wherein the control program sorts items in response to the analyzed characteristic.

33. A system as in claim 32 wherein the characteristic pertains to tempo.

34. A system as in claim 1 which includes a media write unit, coupled to the processor, for writing items identified in a selected play list to a removable medium for subsequent playback.

35. A system as in claim 22 wherein the media items comprise at least one of audio works and video works.

36. A system as in claim 22 wherein the use terminal accumulates item play information for billing purposes.

37. A system as in claim 22 which includes a supervisory processor couplable to the user terminal by the communications link, wherein the supervisory processor, in response to information from the user terminal, produces item play related reports.

38. A system as in claim 3 wherein the inventory station produces reports in response to billing information from the first processor.

39. A system comprising:
 a user station which includes a programmable processor and an associated control program for storing at least one previously created play list, and for retrieving and modifying existing entries of the stored list whereby an updated list to be executed can be created:
 a communications link, coupled to the processor, at least intermittently for receipt of at least some of the works specified by the updated list from a displaced source wherein the control program in response to the entries on the updated list, downloads, from the source, via the link, and then presents at least some of the items on the list to a local user and wherein the control program maintains billing information for transmission to the source for billing the user: and
 wherein the processor includes instructions for receiving some of the works corresponding to the entries on the play list from the displaced source via the communications link after determining the work is unavailable from local sources.

40. A system as in claim 39 wherein the works received from the displaced source via the communications link are maintained locally for present and subsequent use.

41. A system for building a plurality of play lists having entries selected from an inventory which can be obtained at least in part from different sources, the system comprising:
 a data base for storing a plurality of user created prestored play lists:
 a play list editing system having a graphical display and a plurality of instructions which enables a user to simultaneously display portions of an inventory of the stored items and portions of a selected play list including editing instructions enabling a user to select a displayed inventor item and to insert it into the displayed portion of the list thereby creating a modified list and additional instructions for storing the modified list in the data base and for subsequently displaying a plurality of pre-stored lists, each of which can be selected for execution;
 which includes a communications link for downloading at least some members of a selected play list to be presented; and
 wherein the system includes further instructions for downloading at least some members of a selected play list to be presented via the communications link after determining the work is unavailable from local sources.

42. A system for creating and editing play lists comprising:
 a graphical display;
 a data base for storage of a media inventory including at least audio items:
 a processor, coupled to the display and the data base with a plurality of instructions executable by the processor wherein some of the instructions present on one part of the display at least a part of a media inventory listing of at least the stored audio items from which a user can select a plurality of items to be presented and wherein others of the instructions enable the user to select a named, prestored play list and display at least part of the selected list simultaneously on another part of the same display including additional instructions enabling the user to select at least one entry from the media inventory listing and insert the selected entry into the selected play list thereby creating a modified play list, including instructions enabling the user to save the modified play list and to designate a different, named, play list to be displayed on the same display and edited by the user;
 a communications link for acquisition from a displaced source of at least some of the media items on a play list selected for execution; and wherein the processor includes instructions for acquiring from a displaced source at least some of the media items on a play list selected for execution after determining the media items are unavailable from local sources.

43. A system as in claim 9 wherein when the control program presents at least some of the items of the list to local user, the items presented represent the full versions.

44. A system as in claim 22 wherein the media items represent the full versions.

45. A system as in claim 9 wherein the processor includes instructions for downloading at least some of the works specified by the updated list from the displaced source via the communications link at substantially the same time the processor presents the corresponding item on the list to the local user.

46. A system comprising:
a user station which includes a programmable processor and an associated control program for storing at least one previously created play list, and for retrieving and modifying existing entries of the stored list whereby an updated list to be executed can be created;
a communications link, coupled to the processor, at least intermittently, for receipt of at least some of the works specified by the updated list from a displaced source wherein the control program, in response to the entries on the updated list, downloads, from the source, via the link, and then presents at least some of the items on the list to a local user and wherein the control program maintains billing information for transmission to the source for billing the user; and
wherein for at least some of the works specified by the updated list the processor includes additional instructions for downloading the corresponding item from the displaced source via the communications link each time the corresponding item is presented to the user.

47. A system as in claim 21 wherein the processor includes instructions for acquiring at least some of the media items on a play list selected for execution from the displaced source via the communications link at substantially the same time the corresponding media item is presented.

48. A system as in claim 21 wherein for at least some of the media items on a selected play list the processor includes instructions for acquiring the corresponding media item from the displaced source via the communications link each time the corresponding media item is presented.

49. A system as in claim 22 wherein for at least some of the media items the processor downloads media items from the remote inventory via the communications link at substantially the same time the corresponding media item is presented to the user.

50. A system as in claim 22 wherein for at least some of the media items the processor downloads the corresponding media item from the remote inventory via the communications link each time the corresponding media item is presented to the user.

51. A system comprising:
a programmable processor and associated control program for storing at least one previously created play list and for retrieving and modifying existing entries of the stored list whereby an updated play list can be created; and
a communications link coupled to the processor, at least intermittently, for receipt of at least some of the works specified by the updated list from a displaced source wherein the control program, in response to the entries on the updated list, downloads from the source, via the link, and then presents the items on the list to a local user wherein items are downloaded from the displaced source, via the link, each time the corresponding item is presented to the user.

52. A system as in claim 51 wherein at least some of the downloaded works comprise video works.

53. A system as in claim 51 which comprises executable billing related instructions for providing billing information.

54. A system comprising:
a user station which includes a programmable processor and an associated control program for storing at least one previously created play list, and for retrieving and modifying existing entries of the stored list whereby an updated list to be executed can be created;
a communication link, coupled to the processor, at least intermittently, for receipt of at least some of the works specified by the updated list from a displaced source wherein the control program., in response to the entries on the updated list, downloads, from the source, via the link, and then presents at least some of the items on the list to a local user; and
wherein for at least some of the works specified by the updated list the processor includes instructions for downloading the corresponding item from the displaced source via the communications link each time the corresponding item is presented to the user.

55. A system comprising:
a programmable processor and associated control program for storing at least one previously created play list and for retrieving and modifying existing entries of the stored list hereby an updated play list can be created; and
a communications link coupled to the processor, at least intermittently, for receipt of at least some of the works specified by the updated list from a displaced source wherein the control program, in response to the entries on the updated list, downloads from the source, via the link, and then presents the items on the list to a local user wherein items are downloaded from the displaced source, via the link, when the corresponding item is unavailable locally.

56. A system as in claim 55 wherein at least some of the downloaded works are selected from a class which includes at least audio works, video works and other selected sensory, works.

57. A system comprising:
a programmed processor and an associated control program for enabling a user to create a play list identifying works to be presented to the user; and
a communications link coupled to the processor, at least intermittently, for receipt of at least some of the works specified by the list from a displaced source wherein the control program, in response to the entries on the list, downloads from the source, via the link, and then presents at least some of the items on the list to a local user wherein items are downloaded from the displaced source, via the link, each time the corresponding item is presented to the user.

58. A system as in claim 58 wherein the control program includes instructions for storing at least one previously created play list and for retrieving and modifying existing entries in the stored list whereby an updated list can be created.

59. A system as in claim 58 wherein the control program includes instructions for adding new entries in the stored list whereby a revised list can be created.

60. A system as in claim 57 wherein billing information is maintained relative to at least some of the works presented to a user.

61. A system as in claim 60 wherein the control program maintains at least some of the billing information.

62. A system as in claim 61 wherein billing information is transferred to another location.

63. A system as in claim 57 wherein at least some of the downloaded works comprise video.

64. A system comprising:
a user station which includes a programmable processor and associated control program for storing at least one play list; and a communications link coupled to the processor, at least intermittently, for receipt of at least some of the works specified by the list from a displaced source wherein the control program, in response to the entries on the list, downloads from the source, via the link, and then presents at least some of the items on the list to a local user wherein items are downloaded from the displaced source, via the link, after determining that the work is unavailable at the user station.

65. A system as in claim 64 wherein the control program maintains billing information relative to at least some presented items.

66. A system as in claim 64 wherein the works received from the displaced source, via the communications link, are maintained at the user station for present and subsequent use.

67. A system as in claim 64 wherein billing information is accumulated at a location displaced from where the works have been presented to a user.

68. A system comprising:
a user station which includes a first programmable processor and associated control program; and
a communications link coupled to the processor, at least intermittently, for receipt from a displaced source of at least some of the works specified by a user created play list wherein the control program, in response to the entries on the list, downloads from the source, via the link, and then presents the items on the list to a local user wherein items are downloaded from the displaced source, via the link, each time the corresponding item is presented to the user.

69. A system as in claim 68 wherein the control program includes instructions for storing at least one previously created play list and for retrieving and modifying existing entries in the stored list whereby an updated list can be created.

70. A system as in claim 68 wherein at least some of the downloaded works comprise viewable video.

71. A system as in claim 68 wherein the control program maintains billing information relative to at least some of the works presented to a user for billing the user.

72. A system as in claim 68 wherein a portion of the billing related instructions is located at a displaced processors.

73. A system as in claim 68 wherein the displaced processor communicates with the programmable processor, at least part time, via the communications link.

74. A system for building a plurality of play lists having entries selected from an inventory which can be obtained at least in part, from different sources, the system comprising:
a data base for storing a plurality of user created pre-stored play lists;
a play list editing system having a graphical display and a plurality of instructions which enables a user to simultaneously display portions of an inventory of the stored items and portions of a selected play list including editing instructions enabling a user to select a displayed inventory item and to insert it into the displayed portion of the list thereby creating a modified list and additional instructions for storing the modified list in the data base and for subsequently displaying a plurality of pre-stored lists, each of which can be selected for execution; and
a communication link for downloading members to be presented which are not available in the local inventory.

75. A system as in claim 74 wherein works received via the link are maintained locally for present and subsequent use.

76. A system as in claim 74 wherein the control program maintains billing information.

77. A system for executing play lists comprising:
a graphical display;
a processor, coupled to the display with a plurality of instructions executable by the processor wherein some of the instructions present on one part of the display at least a part of a play list and other instructions download, from a displaced source, items on a play list being executed; and
which includes instructions for determining if the respective items are unavailable locally before downloading them.

78. A system for executing play lists comprising:
a graphical display;
a processor, coupled to the display with a plurality of instructions executable by the processor wherein some of the instructions present on one part of the display at least a part of a play list and other instructions download, from a displaced source, items on a play list being executed; and
which includes instructions wherein items on a list being executed are downloaded each time the respective item is presented to a user.

79. A system as in claim 77 wherein the control program maintains billing information relative to at least some of the works presented to a user.

80. A system as in claim 78 wherein the control program maintains billing information relative to at least some of the works presented to a user.

81. A system comprising:
a user station which controls the local presentation of works to a user in accordance with a presentation list;
a communication medium which, at least intermittently, couples the user station to at least one displaced source for the works wherein works on the list can be downloaded from the source and presented at the user station and including executable instructions for accumulating billing information for the downloaded works.

82. A system as in claim 81 which includes instructions for determining if the respective works are unavailable locally before downloading them.

83. A system as in claim 81 which includes instructions wherein works on the list are downloaded each time the respective work is presented to a user.

84. A system comprising:
a programmed processor and an associated control program for enabling a user to create a play list identifying works to be presented to the user; and
a communications link coupled to the processor, at least intermittently, wherein the control program downloads at least some of the works specified by the list from a displaced source via the link, and then presents at least some of the works on the list to a local user, and, instructions for effecting royalty payments to appropriate recipients.

85. A system as in claim 84 wherein the control program includes instructions for storing at least one previously created play list and for retrieving and modifying existing entries in the stored list whereby an updated list can be created.

86. A system as in claim 84 wherein billing information is maintained relative to at least some of the works presented to a user.

87. A system as in claim 84 wherein the works are downloaded each time for presentation to the user.

88. A system comprising:
   a workstation which includes a programmed processor and executable instructions for presenting a plurality of works to a user;
   a communications link coupled to the workstation, at least intermittently, for downloading each work from a remote source each time the work is presented to a user; and
   executable instructions for keeping track of works presented to the user.

89. A system as in claim 88 wherein the remote source includes instructions for establishing popularity information indicative of plays of works during predetermined time intervals.

90. A system as in claim 88 wherein the workstation includes instructions for establishing a pre-presentation credit.

91. A system as in claim 88 wherein the workstation includes executable instructions enabling a user to create at least one play list.

92. A system comprising:
   a workstation which includes a programmed processor and executable instructions for presenting a plurality of works for a user;
   a communications link coupled to the workstation, at least intermittently, for downloading each work from a remote source each time the work is presented to a user; and
   wherein some of the works presented include advertisements and including executable instructions for accumulating billing information based on presented advertisements.

93. A system as in claim 92 which includes executable instructions enabling a user to create at least one play list.

94. A system as in claim 92 wherein the works are selected from a class which includes audio works, video works with and without audio, and, predetermined sensory works.

95. A system as in claim 92 wherein accumulating instructions are executed,. at least in part, at a remote processor.

96. A product producing system comprising:
   a workstation which includes a media recording apparatus wherein a removable medium can be inserted therein and works recorded thereon for subsequent playback on a different player;
   a communications link coupled to the apparatus, at least intermittently, whereby, in response to a prior credit authorization, at least one work can be downloaded from a remote source and record on a removable medium.

97. A system as in claim 96 wherein the workstation includes a processor and executable instructions for, at least in part, requesting a credit authorization from a remote authorizer.

98. A system as in claim 96 wherein the works are downloaded each time from the remote source before being recorded.

99. A system as in claim 96 wherein the workstation includes a display for displaying a user created list of works to be written to a removable medium.

100. A system as in claim 99 wherein the workstation includes a list editor whereby the user can create and modify one or more lists of works.

101. A system in claim 96 which includes an output device whereby a user can preview, at least in part a work in connection with recording same on a removable medium.

102. A system for creating and editing play lists comprising:
   a graphic display;
   a data bas for storage of at least a part of a media inventory;
   a process, coupled to the display and the data base with a plurality of instructions executable by the processor wherein some of the instructions present on one part of the display at least a part of a media inventory listing from which a user can select a plurality of items to be presented and wherein others of the instructions enable the user to select a named, prestored play list and display at least part of the selected list simultaneously on another part of the same display including additional instructions enabling the user to select at least one entry from the media inventory listing and insert the selected entry into the selected play list thereby creating a modified play list, including instructions enabling the user to save the modified play list ad to designate a different, named, play list to be displayed on the same display and edited by the user.

103. A system as in claim 102 which includes a communications link for coupling the processor to a displaced media inventory and instructions for downloading items on a list for presentation to a user.

104. A system as in claim 103 wherein the works are downloaded each time for presentation to the user.

105. A system as in claim 103 wherein the items are downloaded if not available locally.

106. A system comprising:
   a workstation for presenting works to a user and which includes instructions to analyze characteristics of the works.

107. A system as in claim 106 wherein the analysis instructions determine beats per minute of works.

108. A system as in claim 106 which includes instructions to sort some of the works.

109. A system as in claim 106 which includes instructions for presenting a play list to a user and for enabling the user to start the list at a selected entry point.

110. A system as in claim 102 which includes instructions for creating reports of at least one of play list content and inventory content.

111. A method of executing play lists based on a media inventory comprising:
   providing an inventory of at least audibly presentable media items;
   presenting visually at least a part of a preestablished play list based on some of the media items simultaneously while presenting visually, at least in part, a list of media items from the inventory;

editing the play list by selecting at least one media item from the inventory list and inserting it into the play list at a selected location within the list thereby forming a revised play list; and executing selected play list and accumulating royalty payment information.

112. A method of executing play lists based on a media inventory comprising:

providing an inventory of at least audibly presentable media items;

presenting visually at least a part of a preestablished play list based on some of the media items simultaneously while presenting visually, at least in part, a list of media items from the inventory;

editing the play list by selecting at least one media item from the inventory list and inserting it i the play list at a selected location within the list thereby forming a revised play list; and executing a selected play list and accumulating item popularity information.

113. A system comprising:

a workstation which includes a programmed processor and executable instructions enabling a user to create at least one play list and for presenting works from the list to the user;

a communications link coupled to the workstation, at least intermittently, for downloading each work from a remote source each time the work is presented to the user; and wherein some of the presented works include advertisements and including executable instructions for establishing popularity information indicative of plays of works during predetermined time intervals.

114. A system as in claim 113 wherein the works are selected from a class which includes audio works, video works with and without audio, and, predetermined sensory works.

* * * * *

UNITED STATES PATENT AND TRADEMARK OFFICE
CERTIFICATE OF CORRECTION

PATENT NO.    : 6,243,725 B1
DATED         : June 5, 2001
INVENTOR(S)   : James D. Hempleman et al.

It is certified that error appears in the above-identified patent and that said Letters Patent is hereby corrected as shown below:

Column 6,
Line 41, "on an internet" should be -- on an intranet --.

Column 8,
Line 35, "Path File Naine" should be -- Path/File Name --.

Column 11,
Line 22, "as in claim 24" should be -- as in claim 22 --;
Line 28, "play for billing" should be -- play time for billing --.

Column 14,
Lines 60 and 65, "claim 58" should be in each instance -- claim 57 --.

Column 18,
Line 16, "a graphic display;" should be -- a graphical display; --;
Line 34, "ad" should be -- and --;
Line 64, "a preestablished" should be -- a pre-established --.

Column 19,
Line 11, "a preestablished" should be -- a pre-established --;
Line 17, "it i" should be -- it into --.

Signed and Sealed this

Seventeenth Day of September, 2002

Attest:

JAMES E. ROGAN
*Director of the United States Patent and Trademark Office*

*Attesting Officer*

EX PARTE REEXAMINATION CERTIFICATE (6734th)
United States Patent
Hempleman et al.

(10) Number: US 6,243,725 C1
(45) Certificate Issued: Mar. 31, 2009

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Associates, LLC, Chicago, IL (US)

Reexamination Request:
No. 90/008,361, Dec. 8, 2006

Reexamination Certificate for:
Patent No.: 6,243,725
Issued: Jun. 5, 2001
Appl. No.: 08/859,995
Filed: May 21, 1997

Certificate of Correction issued Sep. 17, 2002.

(51) Int. Cl.
G10H 1/10 (2006.01)
G11B 27/34 (2006.01)
G11B 27/11 (2006.01)
G11B 27/034 (2006.01)
G11B 27/36 (2006.01)
G11B 27/031 (2006.01)
G06F 17/30 (2006.01)

(52) U.S. Cl. .............................. 715/210; 707/E17.009; 707/530; 84/601; 84/645

(58) Field of Classification Search .................. None
See application file for complete search history.

(56) References Cited

U.S. PATENT DOCUMENTS

| | | | |
|---|---|---|---|
| 3,291,919 A | 12/1966 | Robitaille | |
| 3,990,710 A | * 11/1976 | Hughes | 369/34.01 |
| 4,528,643 A | 7/1985 | Freeny, Jr. | |
| 4,647,989 A | 3/1987 | Geddes | |
| 4,675,755 A | 6/1987 | Baumeister et al. | |
| 4,703,465 A | 10/1987 | Parker | |
| 4,725,977 A | 2/1988 | Izumi et al. | |
| 4,744,281 A | 5/1988 | Isozaki | |
| 4,766,581 A | 8/1988 | Korn et al. | |
| 4,779,252 A | 10/1988 | Custers et al. | |
| 5,046,004 A | 9/1991 | Tsumura et al. | |
| 5,113,383 A | 5/1992 | Amemiya et al. | |
| 5,132,992 A | 7/1992 | Yurt et al. | |
| 5,157,643 A | 10/1992 | Suzuki | |
| 5,168,481 A | 12/1992 | Culbertson et al. | |
| 5,173,888 A | 12/1992 | An | |
| 5,173,900 A | 12/1992 | Miller et al. | |
| 5,181,107 A | 1/1993 | Rhoades | |
| 5,191,573 A | 3/1993 | Hair | |

(Continued)

FOREIGN PATENT DOCUMENTS

JP H6-274157 * 9/1994

OTHER PUBLICATIONS

"Towards the Digital Music Library: Tune Retrieval from Acoustic Input", McNab et al, DL '96, ACM 0–89791–830–4/96, ACM 1996.*

"Content–Based Classification, Search, and Retrieval of Audio", Wold et al, IEEE 1070–986X/96, IEEE 1996.*

(Continued)

Primary Examiner—Fred Ferris

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

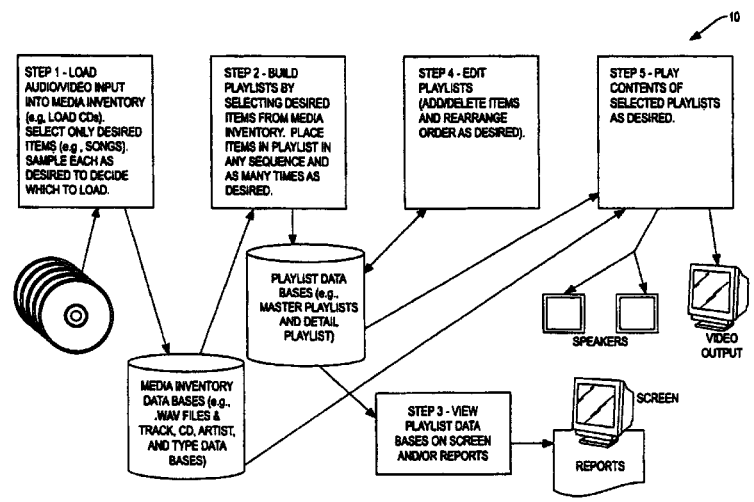

U.S. PATENT DOCUMENTS

| | | | |
|---|---|---|---|
| 5,197,047 A | 3/1993 | Witheridge et al. | |
| 5,262,940 A | 11/1993 | Sussman | |
| 5,288,982 A | 2/1994 | Hosoya | |
| 5,317,732 A | 5/1994 | Gerlach et al. | |
| 5,331,614 A | 7/1994 | Ogawa et al. | |
| 5,341,350 A | 8/1994 | Frank et al. | |
| 5,355,302 A | 10/1994 | Martin et al. | |
| 5,418,713 A | 5/1995 | Allen | |
| 5,428,732 A | 6/1995 | Hancock et al. | |
| 5,475,835 A | 12/1995 | Hickey | |
| 5,481,509 A * | 1/1996 | Knowles | 386/117 |
| 5,515,347 A | 5/1996 | Mulder et al. | |
| 5,541,638 A | 7/1996 | Story | |
| 5,550,575 A | 8/1996 | West et al. | |
| 5,557,541 A | 9/1996 | Schulhof et al. | |
| 5,561,604 A | 10/1996 | Buckley et al. | |
| 5,566,353 A | 10/1996 | Cho et al. | |
| 5,583,922 A | 12/1996 | Davis et al. | |
| 5,586,235 A | 12/1996 | Kauffman | |
| 5,594,601 A | 1/1997 | Mimick et al. | |
| 5,616,876 A * | 4/1997 | Cluts | 84/609 |
| 5,629,867 A | 5/1997 | Goldman | |
| 5,633,839 A | 5/1997 | Alexander et al. | |
| 5,633,842 A | 5/1997 | Nishida et al. | |
| 5,644,764 A * | 7/1997 | Johnson et al. | 707/103 R |
| 5,654,944 A | 8/1997 | Lee et al. | |
| 5,668,788 A | 9/1997 | Allison | |
| 5,670,730 A | 9/1997 | Grewe et al. | |
| 5,675,734 A | 10/1997 | Hair | |
| 5,683,253 A | 11/1997 | Park et al. | |
| 5,689,481 A | 11/1997 | Tamura et al. | |
| 5,691,964 A | 11/1997 | Niederlein et al. | |
| 5,691,972 A | 11/1997 | Tsuga et al. | |
| 5,726,909 A | 3/1998 | Krikorian | |
| 5,726,956 A | 3/1998 | Kanno | |
| 5,732,067 A | 3/1998 | Aotake | |
| 5,734,823 A | 3/1998 | Saigh et al. | |
| 5,740,134 A | 4/1998 | Peterson | |
| 5,751,672 A * | 5/1998 | Yankowski | 709/238 |
| 5,754,521 A | 5/1998 | Yokota | |
| 5,793,980 A | 8/1998 | Glaser et al. | |
| 5,794,249 A * | 8/1998 | Orsolini et al. | 707/104.1 |
| 5,798,921 A | 8/1998 | Johnson et al. | |
| 5,801,694 A * | 9/1998 | Gershen | 715/727 |
| 5,809,246 A | 9/1998 | Goldman | |
| 5,819,160 A * | 10/1998 | Foladare et al. | 455/45 |
| 5,822,284 A | 10/1998 | Nishizawa | |
| 5,860,068 A | 1/1999 | Cook | |
| 5,864,868 A * | 1/1999 | Contois | 707/104.1 |
| 5,867,457 A | 2/1999 | Parvulescu et al. | |
| 5,875,110 A | 2/1999 | Jacobs | |
| 5,890,152 A * | 3/1999 | Rapaport et al. | 707/6 |
| 5,892,915 A | 4/1999 | Duso et al. | |
| 5,903,892 A | 5/1999 | Hoffert et al. | |
| 5,914,941 A | 6/1999 | Janky | |
| 5,918,213 A | 6/1999 | Bernard et al. | |
| 5,918,223 A * | 6/1999 | Blum et al. | 707/1 |
| 5,918,303 A | 6/1999 | Yamaura et al. | |
| 5,920,700 A * | 7/1999 | Gordon et al. | 709/226 |
| 5,926,624 A | 7/1999 | Katz et al. | |
| 5,949,411 A | 9/1999 | Doerr et al. | |
| 5,956,716 A | 9/1999 | Kenner et al. | |
| 5,963,957 A | 10/1999 | Hoffberg | |
| 5,969,283 A | 10/1999 | Looney et al. | |
| 5,974,503 A | 10/1999 | Venkatesh et al. | |
| 5,983,069 A | 11/1999 | Cho et al. | |
| 5,983,176 A * | 11/1999 | Hoffert et al. | 704/233 |
| 5,986,979 A | 11/1999 | Bickford et al. | |
| 6,011,760 A | 1/2000 | Fleming, III | |
| 6,011,761 A | 1/2000 | Inoue | |
| 6,047,292 A | 4/2000 | Kelly et al. | |
| 6,055,566 A | 4/2000 | Kikinis | |
| 6,058,428 A | 5/2000 | Wang et al. | |
| 6,062,868 A | 5/2000 | Toriumi | |
| 6,064,379 A * | 5/2000 | DeMoney | 715/203 |
| 6,065,042 A | 5/2000 | Reimer et al. | |
| 6,067,279 A | 5/2000 | Fleming, III | |
| 6,070,160 A * | 5/2000 | Geary | 707/4 |
| 6,118,450 A | 9/2000 | Proehl et al. | |
| 6,128,255 A | 10/2000 | Yankowski | |
| 6,226,672 B1 * | 5/2001 | DeMartin et al. | 709/219 |
| 6,243,725 B1 | 6/2001 | Hempleman et al. | |
| 6,360,368 B1 * | 3/2002 | Chawla | 725/94 |
| 6,437,229 B1 | 8/2002 | Nobumoto | |
| 6,446,080 B1 | 9/2002 | Van Ryzin et al. | |
| 6,587,403 B1 | 7/2003 | Keller et al. | |
| 7,047,241 B1 * | 5/2006 | Erickson | 707/9 |
| 7,143,102 B2 | 11/2006 | Fiennes et al. | |
| 2002/0010788 A1 | 1/2002 | Nathan et al. | |
| 2002/0016968 A1 | 2/2002 | Nathan et al. | |
| 2003/0014333 A1 | 1/2003 | Brown | |
| 2003/0065639 A1 | 4/2003 | Fiennes et al. | |
| 2004/0078761 A1 | 4/2004 | Ohanian | |

OTHER PUBLICATIONS

"Automatic Audio Content Analysis", Pfeiffer et al, ACM Multimedia 96, pp. 21–30, ACM 1996.*

Schwartz, David, AES 76th Convention, NYC; Specifications and Implementation of a Computer Audio Console for Digital Mixing and Recording. Oct. 8–Nov. 1984; 10 pages.

"News" article about CompuSonics DATS (digital audio transmission system).

"Liquid Audio Strikes Key Partnerships, Technology Deals To Deliver a Sound and Marketable Internet Solution," Multimedia Week, Sep. 2, 1996.

The Compusonics DSP–1000 brochure; Copyright 1986; (3 pages).

The Compusonics DSP–2002 brochure; Copyright 1985; (6 pages).

The Digital Recording Report; Dated Apr. 1986; vol. 3, No. 4; (8 pages).

"The Search for the Digital Recorder;" Dated Nov. 12, 1984; (2 pages).

USA Today; Computerline "Spin a Musical Disk on Personal Computer;" (1 page).

Getting Started With Regulus, SBE Version, Oct. 25, 1984.

Four (4) pages of a Dialog printout featuring items 7 and 8 from file 275; Dated 1984.

Listing dated Oct. 13, 1996 describing EagCD, an audio CD playing utility.

Listing dated Dec. 20, 1994 describing "Windisc," an audio CD player.

M2 Presswire. "Liquid Audio—Lliquid Audio Debuts Premier Music on Demand Solution for the Internet," Copyright 1996 MS Communications Ltd.; Nov. 4, 1996. (2 pages).

Pfeiffer, "Automatic Audio Content Analysis," pp. 21–30, Association of Computing Machinery, 1996.

Printout dated Dec. 31, 1996 which described "CD–REC" for recording off of an audio–CD.

Jakob Nielson, Comparative Design Review: An Exercise in Parallel Design, Apr. 24–29, 1993 ("Nielson Article").

Paul Resnick and Hal R. Varian, "Recommender Systems" Mar. 1997/vol. 40 No. 3 Communications of the ACM.

Architecting Personalized Delivery of Multimedia Information, Shoshana Loeb, Communications of the ACM/Dec. 1992/vol. 35, No. 12.

DSP–1000 Audio Owners Guide; Compusonics Corporation 1986.
August 1984; The Recording Industry Magazine Mix; Compusonics: Another Digital Audio Standard; Neil Weinstock.
Consumer Electronics, June '84, vol. 12, Watch out digital discs: Here comes floppy audio.
1984 Time Inc., Fortune, Nov. 12, 1984; The Search for the Digital Recorder, Brian Dumaine.
A high speed telecommunications Interface for digital audio transmission and reception by hyun heinz sohn; presented at the 76th convention 1984 8–11 New York AES.
MS Presswire Nov. 4, 1996 Liquid Audio; Liquid Audio debuts premier music on demand solution for the internet.
New York Times Jul. 4, 1993; A New Music Retailing Technology Says, 'Listen Here'; by Matt Rothman.
Interchi '93, Apr. 24–29, 1993; Comparative Design Review: An Exercise in Parallel Design.
100 Million iPods Sold; 2007.
Apple Reports First Quarter Results; Jan. 17, 2007.
The DAD486x Digital Audio Delivery System Operation Manual Version 6.0A RevA Jun. 30, 1995.
Apple Announces iTunes 3, Jul. 17, 2002.
Apple—iPod Technical Specifications.
iTunes keeps track of your tastes; 2002.
Webster's New World Dictionary, 1988.
The Authoritative Dictionary of IEEE Standards Terms, 2000.
Webster's Third New International Dictionary, 2002.
Description of the word "Playlist" from Wikipedia from Mar. 9, 2007.
The Concise Oxford Dictionary of Current English.
Microsoft Press Computer Dictionary, 1997.
Mix Your Music in Playlists, Oct. 2005.
Create a playlist with Windows Media Player, Nov. 9, 2005.
PC World Apr. 1985, "Hi–Fi Floppy"; Author: Keith Yates.
Upfront; "High–Tech: New technology challenges the Compact Disc".
The New York Times; Aug. 12, 1996; Technology: Digital Commerce; New ways of sending radio over the Net promist more sound less static; by John Markoff.
CD/Spectrum Pro 3.2: CD–Audio Player with Graphical Spectrum Analyzer. Jun. 19, 1997.
"Download favorite music from Web into computer" from Daily Herald on Monday, Dec. 1, 1997.
Plugged In Aug. 3, 1997; "World Wide Wurlitzer"; "Recorded music coming to the Web, but it'll cost more than 3 plays for a quarter".
Video–on–Demand; Jul. 25, 2005; 3 pages.
CD/Spectrum Pro 3.2 "CD–Audio Player with Graphical Spectrum Analyzer" 4 pages, Jun. 19, 1997.
"Download favorite music from Web into computer" from Daily Herald on Dec. 1, 1997. 2 pages.
Plugged In, "Recorded music coming to the Web, but it'll cost more than 3 plays for a quarter: World Wide Wurlitzer"; Aug. 3, 1997; 1 page.
McNab, "Towards the Digital Music Library: Tune Retrieval from Acoustic Input," pp. 11–96, Association for Computing Machinery, 1996.
Wold, "Content–Based Classification, Search,and Retrieval of Audio," pp. 27–36, Institute of Electrical and Electronics Engineers, 1996.
Pfeiffer, "Automatic Audio Content Analysis," pp. 21–30, Association of Computing Machinery, 1996.

Woo, Office Action Mailed Jun. 6, 2007 in Application No. 10/841,374, United States Patent & Trademark Office.
"Wegener Announces MPEG–Based System for Broadcasters Using Micropolis Video Servers," Mar. 27, 1995.
Author Unknown, "Video–on–Demand" (1995) published by Tampere University of Technology, Finland, available online at: http://www.cs.tut.fi/tit/stuff/vod/VoDOverview/vod.html.
Listing bearing the date of Jul. 29, 1996 describing "CDRunner", a CD–related program.
Listing bearing the date Feb. 12, 1996 describing "Music CD", a Windows CD player.
Listing bearing the date Feb. 22, 1996, two pages, describing "Super CD", a Windows CD Driver.
Listing bearing the date Jul. 23, 1995 describing a CD ROM player for use on a PC.
Listing bearing the date Jul. 20, 1995 describing a CD Assistant V1.0 for Windows.
Listing bearing the date Feb. 1, 1994 describing CDMaster version 1.2 CD player.
Listing bearing the date Oct. 13, 1996 describing "EagCD", a program for playing CDs.
Listing bearing the date Feb. 5, 1996 describing "CD Satellite 3", a music playing program.
Listing bearing the date Feb. 1, 1994 describing "CDAudio V1.27U", a CD audio player.
Listing bearing the date Feb. 1, 1994 describing an Audio Compact disc Player for Windows.
Listing bearing the date Feb. 1, 1994 describing a CD player for Windows.
Listing bearing the date Jun. 23, 1994 describing "Mega CD V1.1 Audio Honker for Windows", a CD audio player.
Listing bearing the data Dec. 20, 1994 describing "WinDisc", a CD audio player.
Listing bearing the date Jan. 24, 1996 describing "A Real 32 Bit" CD player for Windows 95.
Listing dated Feb. 1, 1994 describing a package called "CD Player 2.0 for Windows".
Listing dated May 25, 1995 describing "CD Wizzard", a CD audio player.
Listing dated Sep. 14, 1995 describing CD Tray, Version 3.03, a data base system for CDs.
Listing dated Aug. 13, 1995 describing "Optical Jammer 4.0", a CD audio player.
Listing dated Oct. 13, 1996 describing EagCD, an audio CD playing utility.
Listing dated Feb. 1, 1994 describing "CDMaster", A CD audio player.
Listing dated Oct. 3, 1993 describing "Audio Pro", a CD audio player.
Listing dated Nov. 5, 1995 describing "the Pause Provider", for editing a player list.
Listing dated Apr. 16, 1995 describing Version 4.00 of DMP a module player for MS–DOS machines.
Listing dated Dec. 20, 1994 describing "WinDisc", an audio CD player.
Listing dated Feb. 5, 1996 describing "CD Satellite 3", an audio CD player and playlist builder.
Listing dated Nov. 14, 1995 describing "RibbonCD V1.0", a CD player for Windows.
Listing dated Oct. 17, 1994 describing "CDBar", an audio CD player for Windows.

Listing dated Jul. 30, 1995 describing "HomeWorks" and "Personal Possessions" programs for organizing personal property such as records, tapes and CDs.
Listing dated Dec. 17, 1995 describing "CD Assistant", a music collector organizer.
Printout dated Dec. 31, 1996 which describes "CD–REC" for recoridng off of an audio–CD.
Listing dated Sep. 14, 1994 which describes "CD Audio Recorder", for recording off of audio CD.
Listing dated Dec. 17, 1995 describing "CD Assistant" for organizing a music collection.
Listing dated Dec. 31, 1996 which describes "CD–REC" for recording an audio–CD.
Listing dated Feb. 20, 1994 describing "CDGP" for digital recording of an audio–CD.
Listing dated Jul. 11, 1994 which describes "MODAC", a recorder and a player of WAV files.
Listing dated Dec. 31, 1996 which describes "CD–REC" for recording an audio–CD.
Listing dated Sep. 14, 1994 which describes "CD Audio Recorder" for recording WAV files off of an audio CD.
Listing dated Oct. 17, 1993 which describes "Wave After Wave", a CD Audio player for Windows 3.1.
Listing dated Apr. 30, 1996 which describes a jukebox playing module usable with Windows 95.
Listing dated Jun. 8, 1993 which describes "Multimedia Changer V1.0" for playing WAV files.
Listing dated Jan. 15, 1995 which describes "WaveMaster", a program for playing WAV files.
Listing dated Feb. 1, 1994 which describes CDAudio player fo Windows.
Listing dated Apr. 16, 1997 which describes "CDMaster", a CD player module.
Listing dated May 18, 1996 which describes "TapeMaker", a system for organizing a music collection.
Article dated Dec. 1, 1997 entitled "Download favorite music from Web into computer".
An article believed to have been publishedd Aug. 3, 1997 entitled "World Wide Wurlitzer".
Listing of CD/Spectrum Pro 3.2 Home Page, 2 sheets, a CD audio player, with a last update of Jun. 19, 1997 and two sheets associated therewith defining CDDB Database Connectivity.
Listing bearing the date Jan. 28, 1994 describing two interactive CD related programs, CDBase and CDBase Player.
List bearing the date Jan. 24, 1996 describing A Real 32 Bit Windows 95 CD Player.
DADPro Digital Audio Delivery System Brochure, Enco America, Farmington Hills, MI, 1995.
Nielsen, Jakob et al. "Comparative Design Review: An Exercise in Parallel Design". Apr. 24–29, 1993. Interchi '93.
Lowery, Daryl. "Random–Access Digital Audio–Recording Systems". Jun. 1992.
"Wegener Announces MPEG–Based System for Broadcasters Using Micropolis Video Servers", Mar. 27, 1995.
"Microsoft's The Complete Idiot's Guide to Windows 95" by Paul McFedries with Faithe Wempen, 412 pages; 1995 Que Corporation.
Alpha Books' "The Complete Idiot's Guide to Windows 95"; Second Edition by Paul McFedries; 1997 Que Corporation; 404 pages.
Ace, "Joystick Operation", Nov. 1985. Ampex Corporation, Ampex Training Department. (4 pages).
Aotaki, Keith. "Field Report: Louth Automation ADC–100", Broadcast Engineering, Apr. 1994. Intertec Publishing Corp, Overland Park, KS. (2 pages).
"CartWorks: File Utilities, User's Manual", dbm Systems, Inc., Ridgeland, MS. Amended Jul. 18, 1998. (8 pages).
"CartWorks: MHD 'Music–on–Hard–Drive' QuickSchedule User's Manual", Revised on Feb. 28, 1998. dbm Systems, Inc., Ridgeland, MS. (8 pages).
"CMX 3400: Operations Manual", Aug. 1984 (Revision A: Jan. 2, 1985). CMX Corporation, Santa Clara, CA. p. 3–2. (3 pages).
Brooks Harris. "Off–line/On–line Video Editing: Considerations of Cost Effective Video Post Production". Nov. 1983. (9 pages).
Huber, David Miles. "Audio Production Techniques for Video". 1987. pp. 286–293. (5 pages).
"Grass Valley Group Integrated Production System: IPS 100 Operator's Guide". 1988. Grass Valley Group, Inc. p. 7–1. (3 pages).
"On Air", Louth Automation promotional materials. 1997. Louth Automation. (10 pages).
Mahon, Chandos, "N1 Finds a Match with Louth", TV Technology. Dec. 1994. (1 page).
Cassanmagnago, Mauro. "Louth Brings PC Control to Telepiu", TV Technology. Jan. 1994. (2 pages).
"Profile Professional Disk Recorder PDR 100". Tektronix Profile Professional Disk Recorder PDR 100 promotional materials. 1996. Tektronix, Inc. (4 pages).
"User Manual: Tektronix Profile Family". Apr. 1997. Tektronix, Inc., Wilsonville, OR. (158 pages).
"Virtual Recorder Manual". Revised Sep. 9, 1996 and Oct. 20, 1996. ASC Audio Video Corp. (94 pages).
"VR300 Broadcast Video Server" promotional materials. 1997. ASC Audio Video Corporation, Burbank, CA. (9 pages).
"VR300 Video Server User Manual, Version 1.0". Mar. 20, 1998. ASC Audio Video Corporation. pp. I–V, 3–1 to 4–19; 4–29 to 5–5. (40 pages).
Byrne, Richard and Murphy, Karen. "RCS Works Cart Wall: User's Guide and Reference Manual". Feb. 1994. RCS, Scarsdale, NY. pp. i to 79; M–5. (83 pages).
Bailey, Chris. "CartWorks Eases Labor Pains", Radio World Buyer's Guide User Report. Jun. 26, 1996. (1 page).
"LaKart–200 Multi–Channel Automation System" promotional materials. 1991. BASYS Automation Systems, Inc. (9 pages).
Byrne, Richard and Murphy, Karen. "RCS Works: The Log Editor, User's Guide and Reference Manual". May 6, 1994. RCS, Scarsdale, NY. (43 pages).
"PBS Local Insertion Server: Instruction Manual". Jun. 19, 1996. Microvision, Inc., Budd Lake, NJ. (71 pages).
"NewStar News Automation and Editing Systems" promotional materials. Dec. 1996. Tektronix, Inc., USA. (6 pages).
"WaveStation Digital Audio Automation System: Instruction & Operations Manual". 1997. BSI Broadcast Software International, Gendale, AZ. (113 pages).
"Wegener To Market Digital MPEG–2 Based Video File Server", MultiMedia World Daily News, NAB Broadcasters. Apr. 11–12, 1995. (8 pages).
"The DAD486X Digital Audio Delivery System Operation Manual, Version 6.0A". 1990–1995. Revised Jun. 30, 1995. ENCO Systems, Inc., Farmington Hills, MI. (348 pages).

"The DADPro Digital Audio Delivery System Operation Manual: Version 1.0". 1996. Revised Aug. 20, 1996. ENCO Systems, Inc., Farmington Hills, MI. (424 pages).

"Master Control Manual: The Paperless and Cartless Studio System. Version 3.03". 1990–1994. Radio Computing Services, Inc. (216 pages).

"Master Control: System Training Outline". 1995–1996. Radio Computing Services, Inc., Scarsdale, NY. (205 pages).

Murphy, Karen, et al. "RCS Works. OG2: The On–Air Workstation, User's Guide and Reference Manual". Nov. 15, 1994, RCS, Scarsdale, NY. (45 pages).

"Selector: The Music Scheduling System, Manual". 1979–1991. RCS Radio Computing Services, Inc., Scarsdale, NY. (882 pages).

Farber, David. "PN's Announcement of RealAudio (Nice New Product I had betaed)". Apr. 10, 1995. www.interesting-people.org (3 pages).

Zuckerman, Laurence. "Internet Audio Minus the Delays Is Set to Start on the Web Today". New York Times, Apr. 10, 1995, New York Times Company (2 pages).

"RealAudio Server Administrator's Guide: Release 2.0". 1995, 1996. Progressive Netorks, Inc., USA. (106 pages).

"RealAudio Content Creation Guide: RealAudio Encoder Release 2.0". 1995, 1996. Progressive Networks, Inc., USA. (49 pages).

"RealAudio Player Plus". 1996. Progressive Networks, Inc., Seattle, WA. (42 pages).

Liquid Audio White Paper: Buying Music Over the Internet; By: Ruth Colombo; Copyright 1997 by Liquid Audio, Iinc.; Dated Aug. 8, 1997; Seven (7) pages.

Liquid Audio—Liquid Audio debuts premier music on demand solution for the Internet; M2 Presswire; Copyright 1996 M2 Communications Ltd.; Dated Nov. 4, 1996; Two (2) pages.

Digital Commerce—New ways of sending radio over the Net promise mor sound and less static; By: John Markoff; Copyright 1996 The New York Times Company; The New York Times; Dated Aug. 12, 1996—Late Edition; Two (2) pages.

Heard on the beat; Sound of CD–quality music flowing on web; By Karen Kaplan; Copy right 1996 The Times Mirror Company; Los Angeles Times; Dated Nov. 25, 1996—Home Edition; Two (2) pages.

Enteractive Briefs: Near–Cd–Quality music flowing from internet; Copyright 1996 Billboard Publications, Inc.; Billboard; Dated Nov. 16, 1996; Two (2) pages.

Cyberscene; Copyright 1997 Sentinel Communications Co., Orlando Sentinel (Florida); Dated Mar. 1, 1997—Metro; Two (2) pages.

Liquid Audio Brings Dolby Digital Internet Audio to Macintosh Computers; Copyright 1997 Business Wire, Inc., Business Wire; Dated Apr. 7, 1997; Two (2) pages.

Liquid Audio Delivers Dolby Digital Music via Web; By Jeremy Carl; Copyright 1997 Mecklermedia Corporation, Internet World; Dated Mar. 24, 1997; Two (2) pages.

Liquid Audio Sales brochure by Liquid Auto; Copyright 1998 Liquid Audio, Inc.; Eight (8) pages.

ENCO Systems, DAD486x Digital Audio Delivery System Operation Manual, version 6.0A, 1995.

ENCO Systems, DAD486x Digital Audio Delivery System Brochure, 1995.

Radio Computing Services, Inc., Selector The Music Scheduling System Manual, Jan. 1991.

Wegener Announces MPEG–2 Based System for Broadcasters Using Micropolis Video Servers, Mar. 27, 1995.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–114 are cancelled.

New claims 115–117 are added and determined to be patentable.

*115. A system comprising:*
*a workstation for presenting digital audio and/or video works to a user, said workstation including:*
  *a digital processor;*
  *a digital storage medium operatively associated with said digital processor for storing an inventory of digital audio and/or video works, each of said digital works having one or more characteristics, said digital storage medium, in addition, storing information indicative of the date each of said digital works was added to said inventory;*
  *a user interface including a display operatively associated with said digital processor for receiving a user entry designating at least one characteristic, said digital processor executing instructions to compare said designated characteristic with the characteristics of each of said digital works, selecting digital works with characteristics that match said designated characteristic, and, utilizing said stored date added information, listing said selected digital works by the date the works were added to the inventory; and*
  *said processor playing back said listed digital works.*

*116. A system comprising:*
*a workstation for presenting digital audio and/or video works to a user, said workstation including:*
  *a digital processor;*
  *a digital storage medium operatively associated with said digital processor for storing an inventory of digital audio and/or video works, each of said digital works having one or more characteristics, said digital storage medium further comprising a data base for storing information indicative of the characteristics of each of said digital works as well as information indicative of the date each of said digital works was added to said inventory;*
  *a user interface including a display operatively associated with said digital processor for receiving a user entry designating at least one characteristic, said digital processor executing instructions to search for said designated characteristic within the information stored for each of said digital works, selecting digital works having characteristics which match said designated characteristic, and, utilizing said stored date added information, listing said selected digital works by the date the works were added to the inventory; and*
  *said processor playing back said listed digital works.*

*117. A system comprising:*
*a workstation for presenting digital audio and/or video works to a user, said workstation including:*
  *a digital processor;*
  *a digital storage medium operatively associated with said digital processor for storing an inventory of digital audio and/or video works, said digital storage medium further storing a plurality of information records, each associated with a particular one of said digital works and including information identifying one or more characteristics of its associated digital work, and each further including information indicative of the date that the associated digital work was added to the inventory;*
  *a user interface including a display operatively associated with said digital processor for receiving a user entry designating at least one characteristic, said digital processor executing instructions to search for said designated characteristic within the characteristics identified in each of said information records, selecting those digital works which have matching characteristics, and, utilizing said date added information contained in said information records, listing said selected digital works by the date the works were added to the inventory; and*
  *said processor playing back said listed digital works.*

* * * * *